July 12, 1955 R. E. DUPLESSIS 2,712,663
PREWELT UPPER SHAPING MACHINES
Filed Jan. 19, 1952 11 Sheets-Sheet 1

Inventor
Rene E. Duplessis
By his Attorney
Thomas J. Ryan

*Inventor*
Rene E. Duplessis
By his Attorney
Thomas J. Ryan

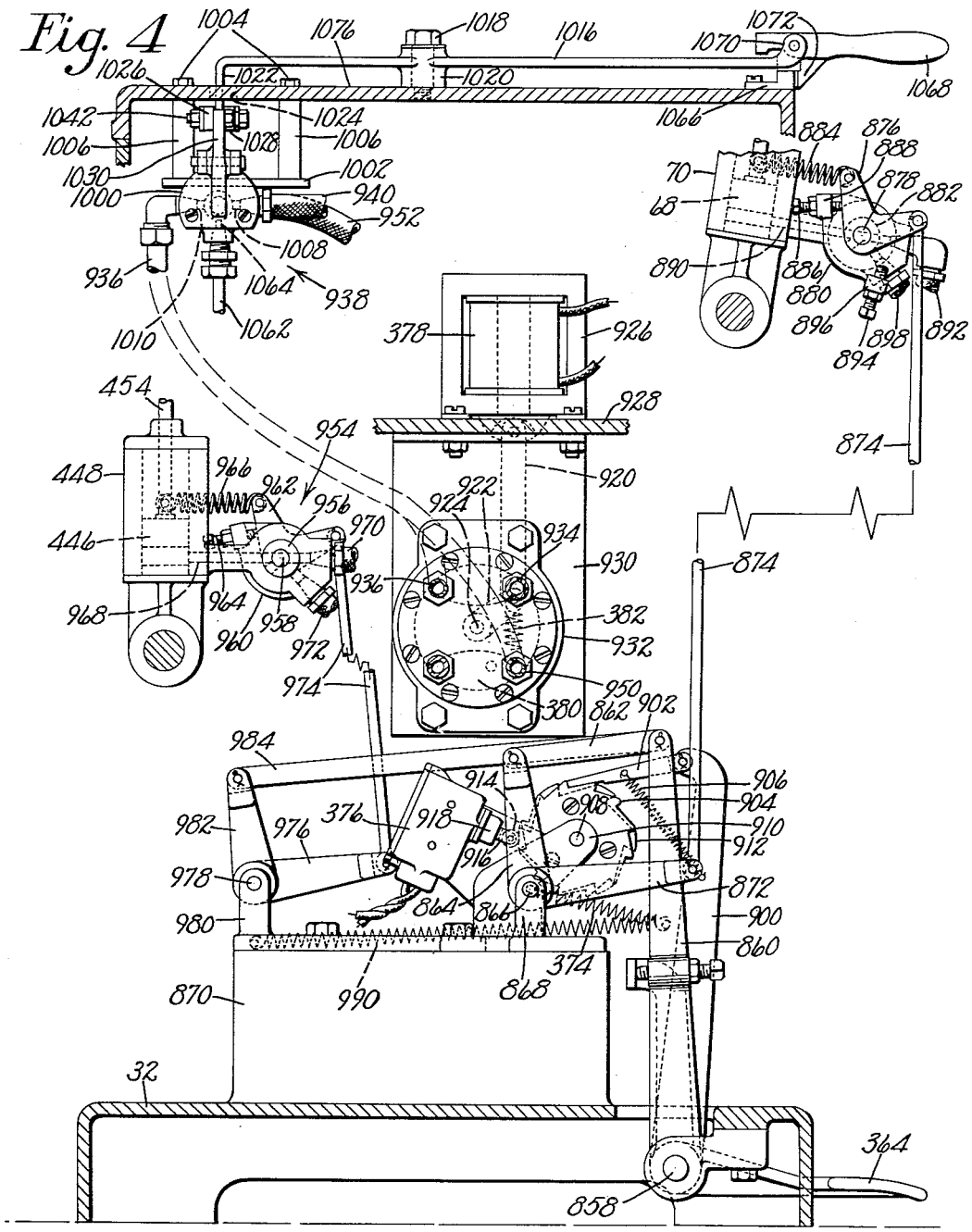

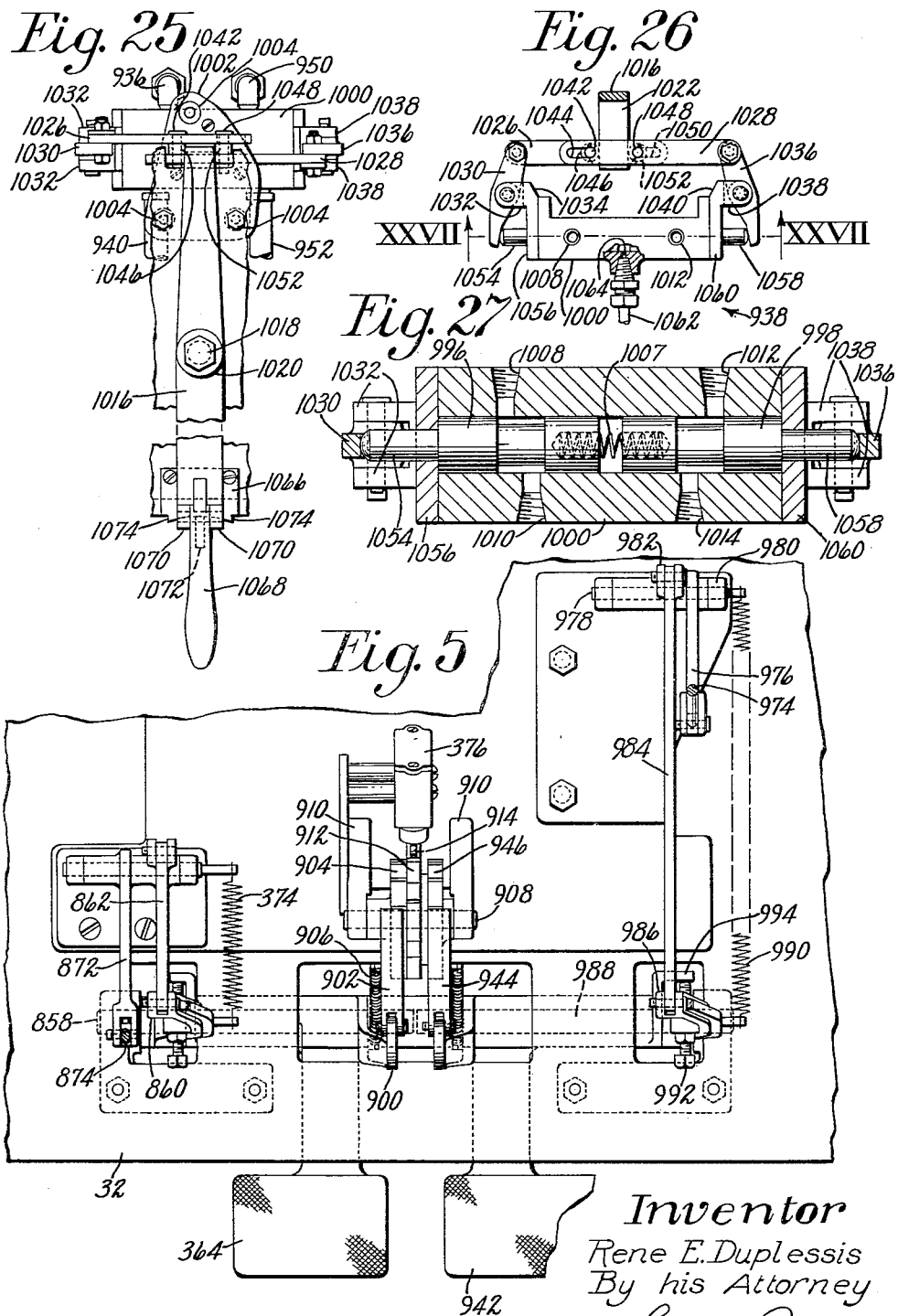

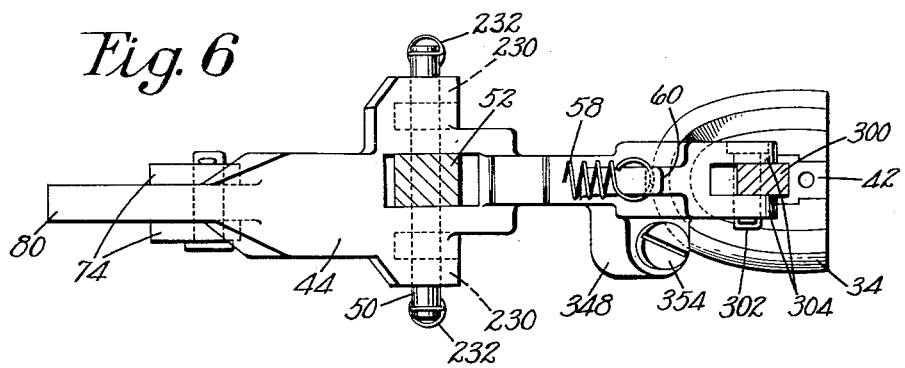
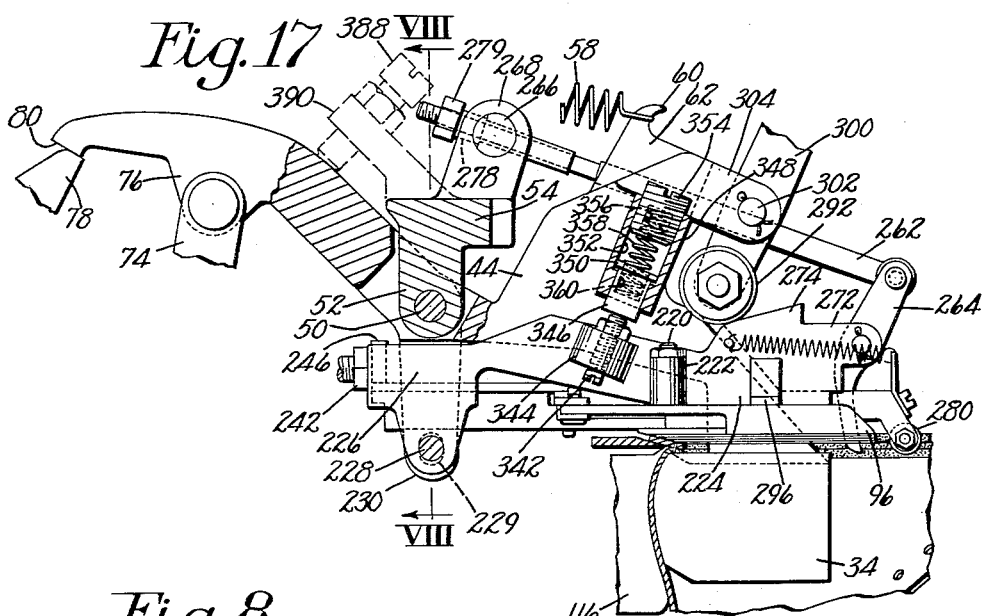
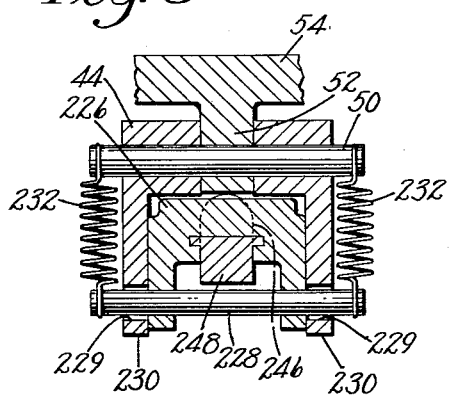
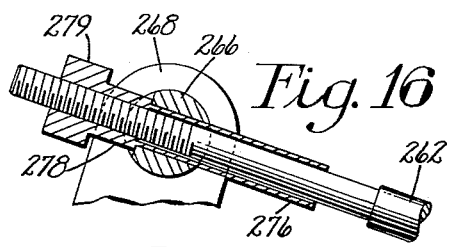
Inventor
Rene E. Duplessis
By his Attorney
Thomas J. Ryan July 12, 1955 R. E. DUPLESSIS 2,712,663
PREWELT UPPER SHAPING MACHINES
Filed Jan. 19, 1952 11 Sheets-Sheet 8
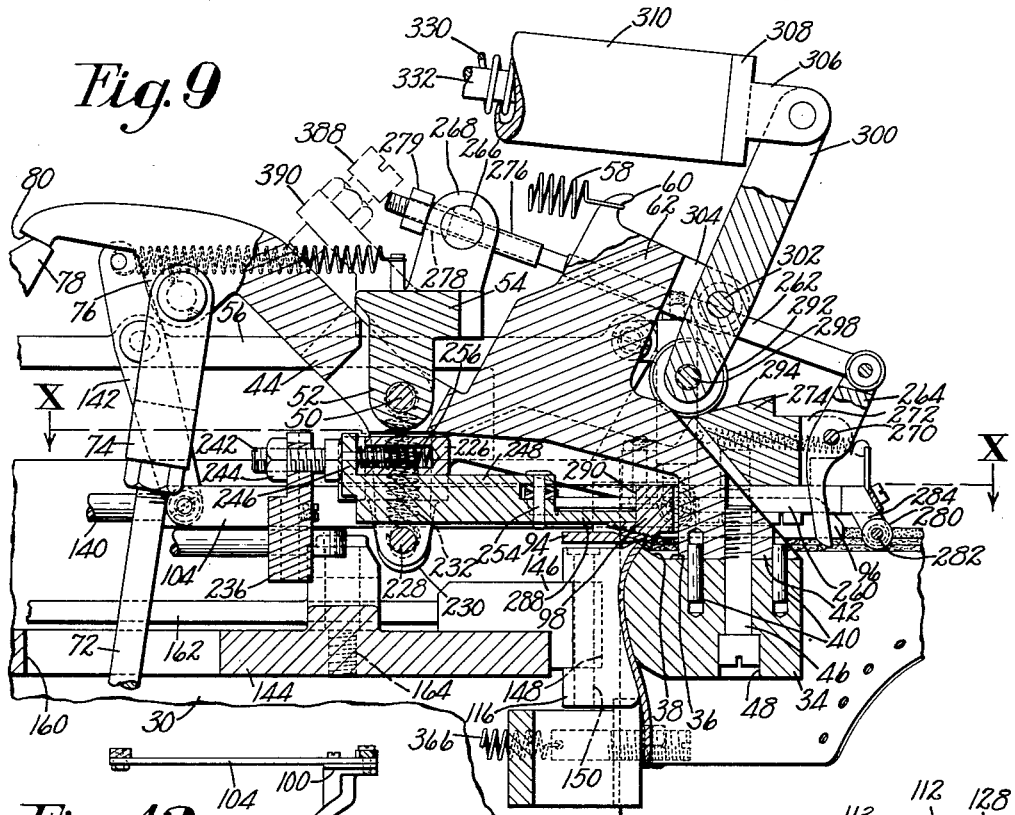
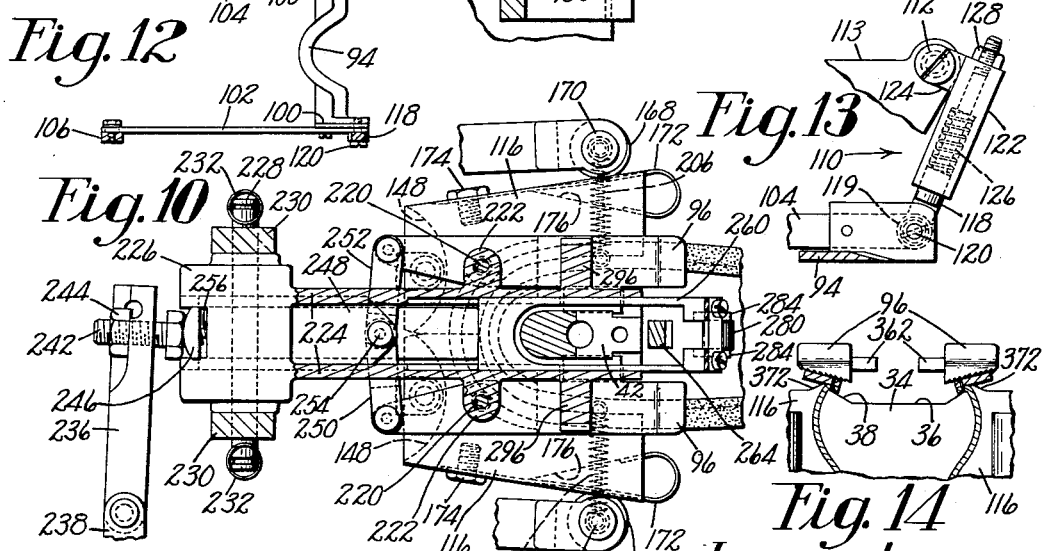
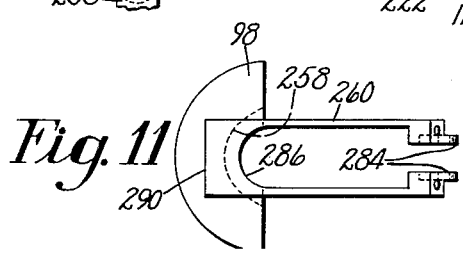
Inventor
Rene E. Duplessis
By his Attorney
Thomas J. Ryan July 12, 1955

R. E. DUPLESSIS 2,712,663

PREWELT UPPER SHAPING MACHINES

Filed Jan. 19, 1952

*Inventor*
Rene E. Duplessis
By his Attorney
Thomas J. Ryan

July 12, 1955  R. E. DUPLESSIS  2,712,663
PREWELT UPPER SHAPING MACHINES
Filed Jan. 19, 1952  11 Sheets-Sheet 10

*Inventor*
Rene E. Duplessis
By his Attorney
Thomas J. Ryan

July 12, 1955     R. E. DUPLESSIS     2,712,663
PREWELT UPPER SHAPING MACHINES
Filed Jan. 19, 1952     11 Sheets-Sheet 11
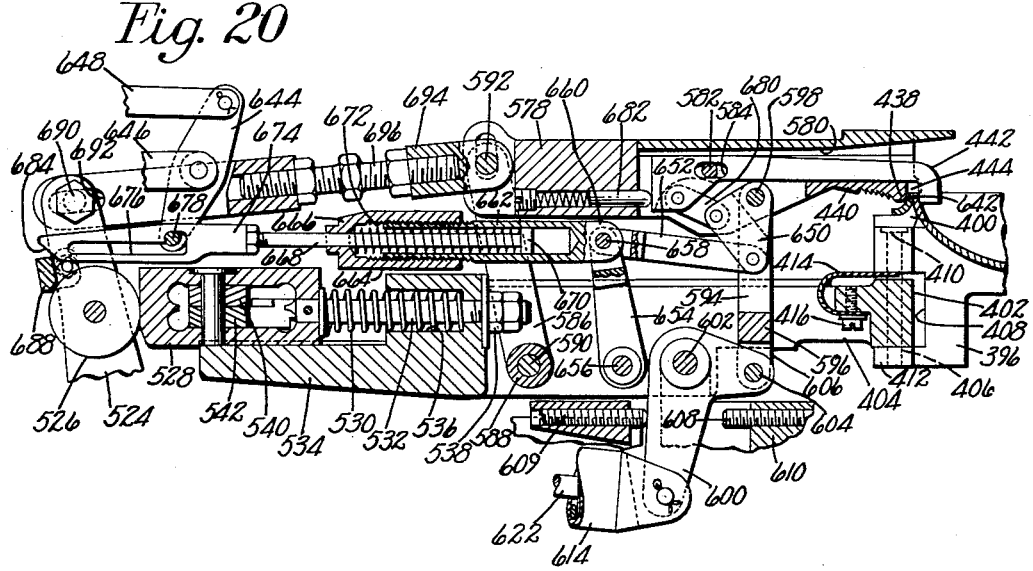
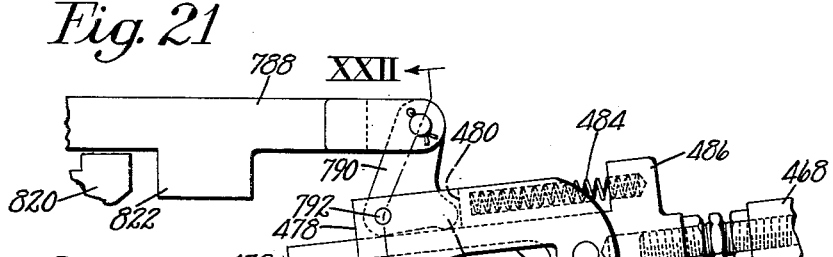
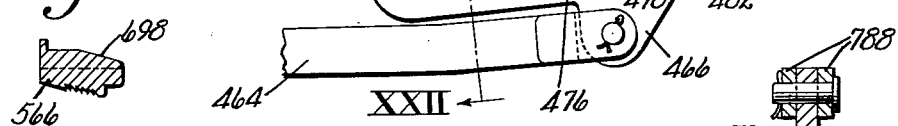
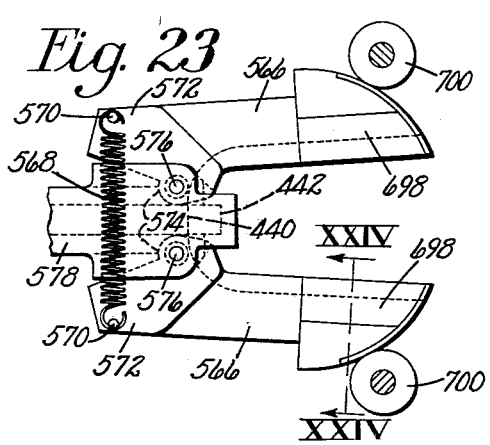
*Inventor*
Rene E. Duplessis
By his Attorney
Thomas J. Ryan United States Patent Office 2,712,663
Patented July 12, 1955

2,712,663
PREWELT UPPER SHAPING MACHINES

René E. Duplessis, Beverly, Mass., assignor to United Shoe Machinery Corporation, Flemington, N. J., a corporation of New Jersey Application January 19, 1952, Serial No. 267,265

129 Claims. (Cl. 12—97)

This invention relates to machines for shaping uppers and is herein illustrated in its application to machines for shaping the end portions of prewelt uppers. Machines of this type are illustrated and described in United States Letters Patent No. 2,359,762, granted October 10, 1944, and No. 2,480,926, granted September 6, 1949, each in the name of Eric A. Holmgren. It is to be understood, however, that the invention is not limited to machines which operate on prewelt uppers but in certain aspects thereof is applicable to shoe shaping machines generally.

It is an object of the present invention to provide a machine of the type above described which, while retaining the advantages of the machines disclosed in the Holmgren patents, provides for increased facility in the operation of such machines and better preparation of the work for the subsequent operations to be performed thereon.

With the above objects in view the invention in one aspect thereof consists in the combination in a machine of the type above described, of means herein illustrated as a welt lifter constructed and arranged to engage the outer margin of the upper attaching face of the welt, means herein illustrated as a welt presser constructed and arranged to engage the inner margin of the outsole-attaching face of the welt, and means for actuating said welt engaging members to bend the welt into a position in which it is inclined downwardly toward the interior of the upper. Preferably the degree of inclination of the welted margin effected by the welt engaging members is substantially commensurate with the normal spring back of the welted margin of the upper so that the welt will be arranged in the most advantageous position for attachment to an outsole upon the completion of the operation of the illustrated machine. In the illustrated organization three welt pressers are provided, one of said pressers being constructed and arranged to engage an end portion of the welted margin and the other two being arranged to engage opposite side portions thereof. As in the machines of the Holmgren patents above referred to, the upper is shaped over an inner form. In accordance with a feature of the present invention the inner form is provided with a sole face characterized by a beveled margin forming the periphery of a recess, said beveled margin serving to facilitate the overmolding of the welted margin of the upper by the welt engaging members. The illustrated welt lifter is mounted on a parallel motion mechanism and means is provided for actuating the parallel motion mechanism to cause the welt lifter to advance with an upward component of movement which imparts a lifting action to the outer margin of the welt. The welt lifter is arranged in adjacent relation to the upper surface of an outer form and in order to provide for a measured rectilinear movement of the welt lifter upon the upper surface of the form, the parallel motion mechanism includes an extensible link which yields to permit the desired rectilinear movement of the lifter. In accordance with a feature of the invention the welt lifter is characterized by a generally wedge-shaped structure whereby the welt lifter engages the upper-attaching face of a welt on the outer form during the rectilinear movement thereof. It will be understood that the wedge-shaped structure of the welt lifter also contributes to the overmolding of the welted margin. In accordance with a further feature of the invention the welt pressers are characterized by welt engaging surfaces which are beveled downwardly and inwardly and inwardly toward the center of an upper in the machine in order to promote the overmolding of the welted margin and in order to obviate heavy pressure of the welt pressers against the cemented surface of the outwardly extending margin of the outsole-attaching surface of the welt.

In order to provide for a resiliently yielding pressure of the outer forms against opposite sides of an upper in the machine each of the outer forms carries a spring constructed and arranged to be engaged by a roll carried by an operating member. A suitable actuator is provided for operating said members to press the outer forms against opposite sides of the upper and the same actuator advances the forms bodily and forces them positively against an end portion of the upper to perform a molding action thereon. In the illustrated organization the actuator is advanced by fluid pressure and the full force of the fluid pressure is brought to bear against those portions of the outer forms which engage the end portions of the upper. In the operation of the machine the fluid pressure is maintained on the outer forms during the greater part of the machine cycle in order to increase the effect of the molding operation on the end portion of the upper. In the illustrated organization the actuator above referred to also operates to advance the welt presser members to cause them to wipe the welted margin of the upper inwardly over the inner form.

In accordance with a further feature of the invention the illustrated welt pressers are mounted on a carrier for self-leveling movement relatively to the welted margin of a supported prewelt upper so that the pressure of the welt pressers is imparted with substantial uniformity to the entire extent of that portion of the welted margin which the welt pressers contact. In the illustrated organization the carrier for the welt pressers also mounts the inner form and is operable to advance the inner form and the welt pressers from a remote position into their respective operating positions. The illustrated organization requires the mounting of the upper on the inner form while it is in its retracted position since the initial operation of the welt pressers occurs during the advancement of the carrier to bring the inner form into its operating position. This initial pressure occurs when the pressers meet resistance caused by the engagement of the work with the outer forms during the advancement of the carrier. In the operation of the illustrated machine the final molding pressure is applied to the welt pressers during the advancement of the outer forms to wipe the upper in an endwise direction upon the outer surface of the inner form. The welt pressing assembly includes a pair of pressers which are advanced widthwise of the upper to overwipe the welted margin. Said pressers are fulcrumed for wiping movement on a member mounted in the carrier above referred to. Upon the completion of the advancement of the carrier, power operated means causes the welt pressers to apply molding pressure to the welted margin of the upper.

In another aspect thereof the present invention consists in the provision of an expander for shaping the toe portion of an upper and a member mounting the expander for movement heightwise of the upper with a toeward component while the upper is held against displacement by means gripping a portion of the upper adjacent to the welt, said means in the illustrated organization comprising the outer forms and a sole shaped plate positioned above the expander. To facilitate the mounting of a prewelt upper on the outer forms each of said forms has a lip extending upwardly therefrom for engagement with a prewelt upper in the welt crease. In order to obviate the application of excess pressure to the welted margin during the molding operation performed thereon by the illustrated machine, each of the outer forms is supported against downward movement by resilient means, herein illustrated as a spring plate. In the illustrated organization the expander is operated by the same actuator which advances the outer forms and means is provided whereby the actuator maintains the upper shaping pressure on the outer forms during the operation of the expander.

In accordance with a further feature of the invention a prewelt upper is automatically positioned relatively to operating instrumentalities of the machine by a member engaging the outsole attaching face of the welt and means for gripping the welted margin against the member, both the member and the gripping means being advanced automatically with the welted margin to position it for the upper shaping operations. In the illustrated organization the gripping means comprises a gripper member constructed and arranged to engage the inner surface of the welted margin of a prewelt upper and to grip the welted margin against an end wiper. In the illustrated organization the end wiper is one of the welt pressers hereinbefore referred to. The wiper is preferably provided with means against which the welted margin is located to gage its position heightwise thereof in the machine. For mounting the end wiper the illustrated machine is provided with a parallel motion mechanism one element of which is operated to move the wiper heightwise of the upper into its overwiping position. The illustrated gripper member is mounted in the wiper carrier and moves relatively to the carrier to grip the welted margin against the wiper. The gripper member is released and moved out of the path of overwiping movement of the wiper preparatory to the overwiping operation. Such release occurs when the connections through which the gripper is operated are automatically broken. In the illustrated organization said connections are broken by the initial advancement of the member which operates the wiper. In their initial positions the wiper and the gripper member are elevated above the overwiping position of the wiper in order to facilitate the introduction of a prewelt upper into the machine and the gripper and the wiper are moved downwardly by relatively light pressure to bring the welted margin of the upper into position for the overwiping operation. Upon the completion of the overwiping operation relatively heavy pressure is imparted to the wiper to cause it to apply gripping pressure to the welted margin.

In the illustrated organization the wiper is mounted on the slide which carries the outer forms and a common actuator is provided for advancing the forms and imparting overwiping movement to the wiper. Wiping pressure is imparted to the wiper by means carried by the slide, said means in the illustrated organization including the parallel motion mechanism hereinbefore referred to. It will be understood that the gripper for gripping the welted margin against the wiper also moves with the slide during the advancement of the outer form into upper engaging position.

The illustrated upper shaping expander is mounted for movement heightwise of the upper with a toeward component in a carrier which is actuated to carry the expander from a remote position into a position within a shoe upper in the machine, the upper being held throughout the upper shaping operations by means gripping the upper along a line adjacent to the welt. In order to provide for automatic retraction of the expander upon the completion of the upper shaping operations breakable connections are provided between the expander and its actuating member and yielding means is provided for retracting the expander when said connections are broken.

In the illustrated organization the means for imparting gripping pressure to the welt presser members or wipers is mounted in a slide on said carrier. A common actuator advances the expander and the slide which carries the means for applying pressure to the wipers.

The automatic disengagement of the breakable connections to the welt pressing means is effected by the operation of mechanism in one station of the machine upon the completion of the upper shaping operation in the other station. The same mechanism also operates to break the operating connections to the carrier for the expander and the welt pressing means to permit a return of the carrier to its rest position.

In another aspect thereof the invention consists in the combination with a shoe shaping instrumentality, which in the illustrated organization is the inner form, of a pressure fluid operated piston for advancing the instrumentality, a valve for controlling the operation of the piston, means herein illustrated as a spring for retracting the piston when the valve is opened to exhaust, and means herein illustrated as a latch member for holding the instrumentality advanced after the piston is retracted. The latch member holds the instrumentality advanced until the other station is put through its operating cycle, the operation of the other station effecting the actuation of mechanism for releasing the latch member to permit the return of the operating instrumentality to its rest position. In the illustrated organization a second shoe shaping instrumentality, which, in the illustrated machine, is the pair of outer forms, is operated by means including a micro-switch and the micro-switch is automatically operated by the spring which operates the valve above referred to. In its application to two-station machines the present invention provides a shut-off valve through which extend the pressure lines to both stations and a novel manually operated mechanism is provided for conveniently operating said shut-off valve in order to permit one station of the machine to be operated while the other remains idle.

These and other features of the invention will now be described with reference to the accompanying drawings and pointed out in the appended claims.

In the drawings,

Fig. 4 is a sectional view on a plane from front to back through the center of the machine illustrating only portions of the hydraulic mechanism and parts associated therewith;

Fig. 5 is a plan view illustrating certain treadle operated mechanisms;

Fig. 6 is a plan view illustrating the upper shaping form in the heel station and certain mechanisms associated therewith;

Fig. 8 is a section on the line VIII—VIII of Fig. 17;

Fig. 9 is an enlarged sectional view on a plane extending from front to back through the center of the heel station with the upper under pressure;

Fig. 10 is a plan view partly in section on the line X—X of Fig. 9;

Fig. 11 is a detail plan view illustrating one of the parts shown in Figs. 9 and 10;

Fig. 12 is a detail plan view illustrating the welt lifting mechanism shown in Fig. 9;

Fig. 13 is a side elevation illustrating certain details of the welt lifting mechanism;

Fig. 14 is a front elevation illustrating the upper shaping forms and the welt pressers in the heel station in their position shown in Fig. 9;

Fig. 16 is a section on the line XVI—XVI of Fig. 2;

Fig. 17 is a side elevation similar to Fig. 9 illustrating mechanism not shown in said figure;

Fig. 20 is a section on the same plane as Fig. 19 illustrating certain operating mechanisms in the toe station;

Fig. 21 is an enlarged detail view in side elevation illustrating certain mechanisms in the toe station;

Fig. 22 is a section on the line XXII—XXII of Fig. 21;

Fig. 23 is a plan view illustrating the welt pressers in the toe station;

Fig. 24 is a section on the line XXIV—XXIV of Fig. 23;

Fig. 25 is a plan view of a valve operating mechanism;

Fig. 26 is a front elevation illustrating certain mechanisms shown in Fig. 25; and Fig. 27 is a section on the line XXVII—XXVII of Fig. 26.

Figure 1:
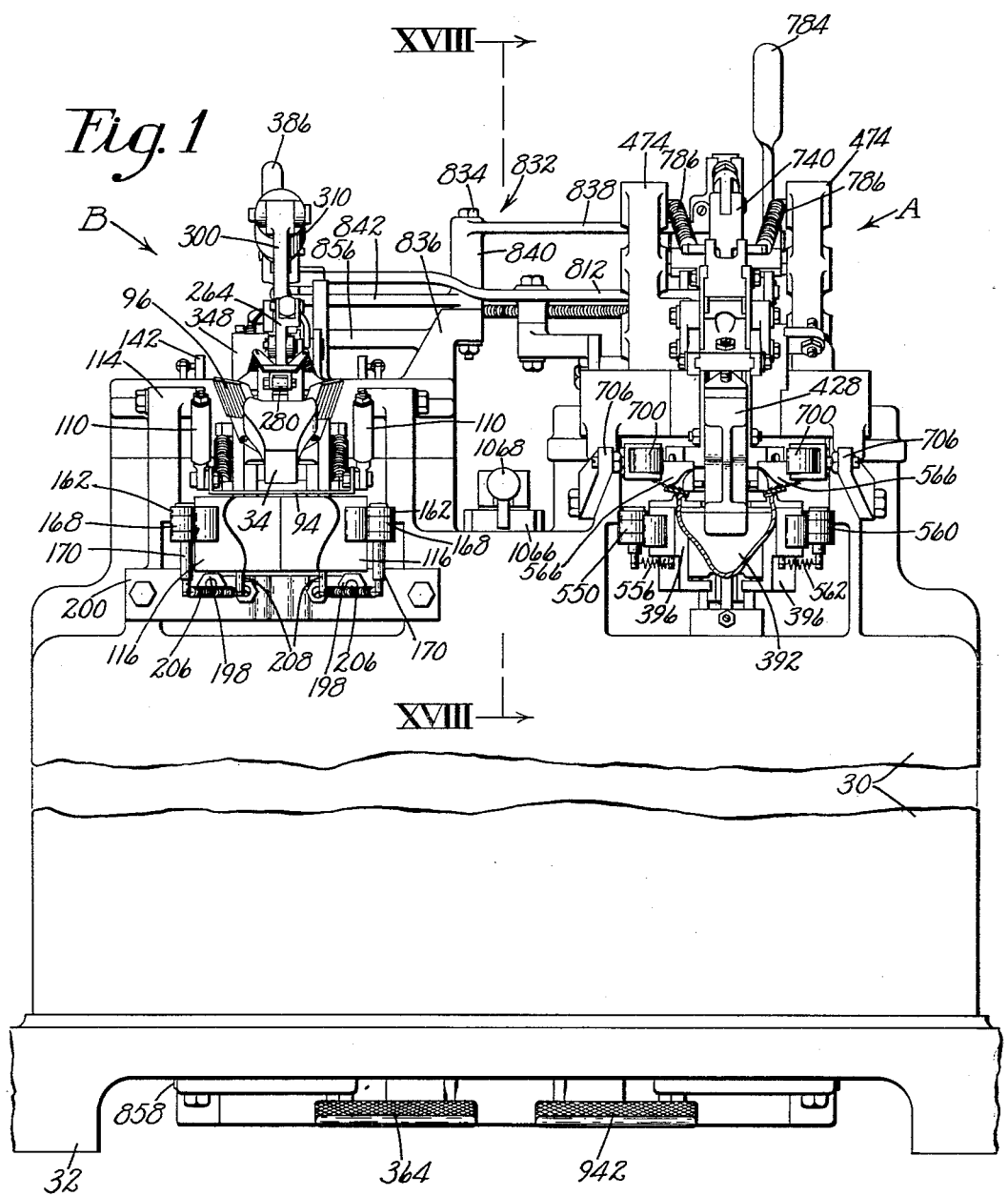
Fig. 1 is a front elevation of a machine embodying the features of the present invention, the center of the base portion of the machine being broken away.

Referring to Fig. 1, the illustrated machine comprises a standard 30 mounted on a base 32 and having in its upper portion a toe station A and a heel station B. In common with the machine of the Holmgren patents hereinbefore referred to each station of the machine is provided with mechanism constructed and arranged to engage the welted margin of a prewelt upper and to bend the welt outwardly into outsole attaching position. For shaping the upper each station is provided with an inner form constructed and arranged to enter the upper and to shape it against a pair of outer forms which close on the upper and press it against the inner form.

Figure 2:
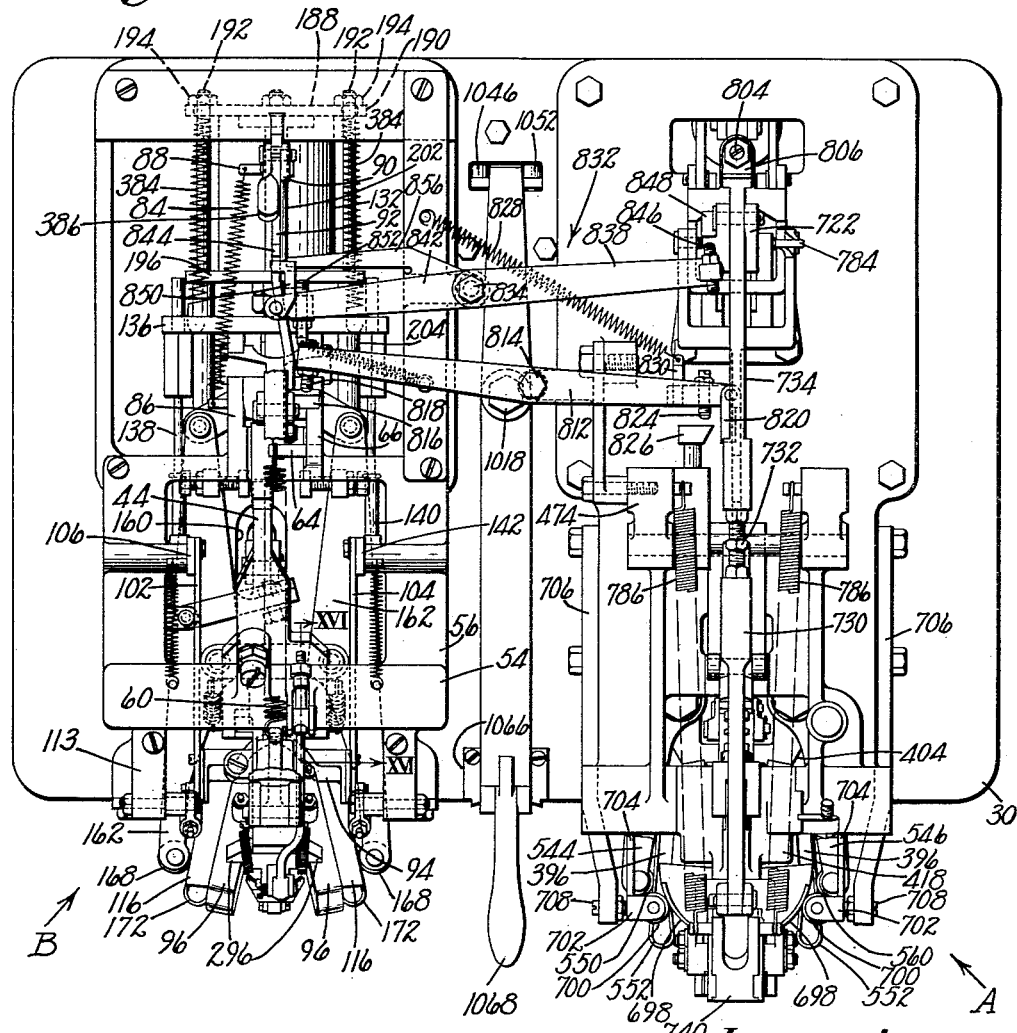
Fig. 2 is a plan view of the entire machine.
Figure 7:
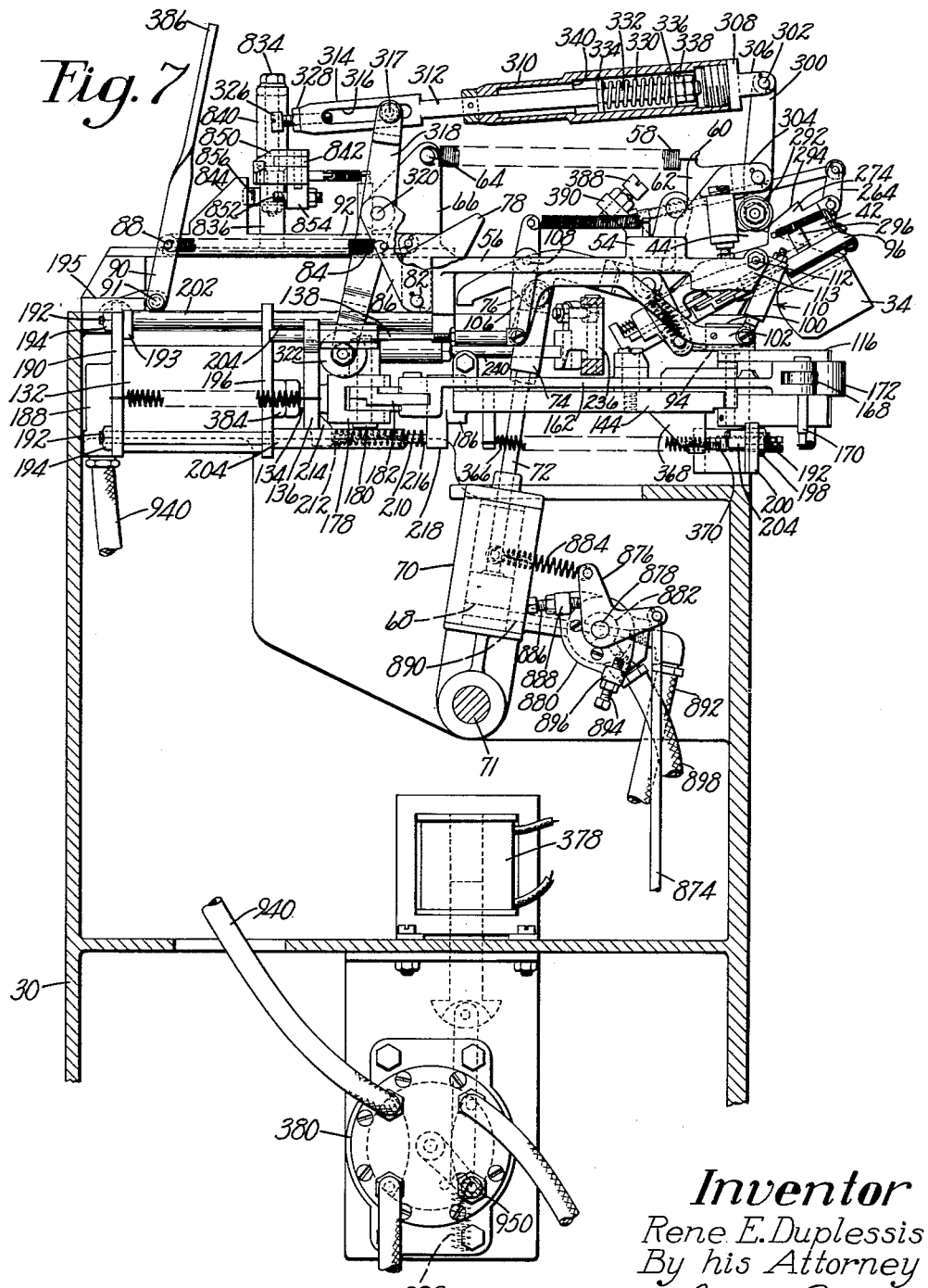
Fig. 7 is a left side elevation illustrating the heel station in its rest position, the side wall of the frame being broken away to disclose the mechanism within.

Referring to Fig. 9 an inner form for shaping the heel end portion of a prewelt upper is identified by the numeral 34. The illustrated form is a solid block having the general shape of the heel end portion of a last. For a purpose hereinafter described the heel form has a recess 36 formed in its upper surface and terminating in a beveled wall 38. The heel form is drilled to receive two dowel pins 40 which locate the heel form relatively to a head 42 at the forward end of a lever 44 (Fig. 6), the head 42 being drilled to receive the dowel pins. The heel form is secured to the head 42 a headed screw 46 seated in a counterbore 48 in the heel form. The lever 44 is fulcrumed on a shaft 50 (Figs. 8 and 17) mounted in a lug 52 extending downwardly from a crosshead 54 in the forward portion of a fixed plate 56 which, as seen in plan view in Fig. 2, is in the form of a hollow square. When the machine is at rest the heel form is in its elevated position shown in Fig. 7 in which position it is held by a spring 58 the forward end of which is anchored to a hook 60 formed in an upward extension 62 of the lever 44 and the rear end of which is anchored to a pin 64 in a fixed plate 66. In the operation of the machine a piston 68 mounted in a cylinder 70 fulcrumed on a shaft 71 is actuated by pressure fluid to swing the lever in a clockwise direction as seen in Fig. 7 into its position shown in Fig. 9. The piston 68 is connected to the lever by a piston rod 72 having at its upper end a head 74 which is pivotally mounted on a lug 76 extending downwardly from the rear portion of the lever 44. The lever 44 is positively held against return movement from its position shown in Fig. 9 by a detent 78 which engages the flat end face of a downturned end portion 80 of the lever 44. As shown in Fig. 7 the detent 78 is pivotally mounted on a fixed pin 82 and is yieldingly held in its position shown in Fig. 7 by a tension spring 84 the forward end of which is connected to one of a pair of fixed plates 86 connected to the detent and the rear portion of which is anchored to a pivot pin 88 connecting a lever 90 to a link 92 which extends forwardly from the lever and is pivotally connected at its forward end to the detent 78. The lever 90 is fulcrumed at its lower end on a fixed pin 91.

For bending the welted margin of the heel portion of a prewelt upper outwardly into outsole attaching position the illustrated machine is provided with a welt lifter 94 (Figs. 9 and 12) constructed and arranged to engage the upper attaching face of the welt, a pair of welt pressers or wipers 96 (Fig. 14) constructed and arranged to engage the outsole attaching face of the welt at opposite sides of the heel end portion of the upper and a welt presser or wiper 98 (Figs. 9 and 11) constructed and arranged to engage the outsole attaching face of the welt at the extremity of the heel end portion of the upper. Referring to Fig. 7, the opposite end portions of the welt lifter 94 are bent to form two upright sections 100. The section 100 at the left side of the welt lifter is fixed to the forward portion of a link 102 which is arched over mechanism hereinafter described and the section 100 at the right side of the welt lifter is fixed to a straight link 104 (Fig. 12). The links 102 and 104 are elements of parallel motion mechanisms which operate to advance the welt lifter 94 without changing its angular disposition. The other elements of the parallel motion mechanism at the left side of the welt lifter comprise a lever 106 pivotally mounted between its ends on a pin 108 mounted in the plate 56 and an arm 110 (Fig. 13) pivotally mounted at its upper end on a headed screw 112 (Fig. 7) mounted in a forward extension 113 (Fig. 2) of the plate 56. The lower end of the lever 106 is pivotally connected to the rear end of the link 102 and the lower end of the arm 110 is pivotally connected to the forward end of the link. Except for the construction of the link 102, the parallel motion mechanism at the right side of the welt lifter 94 is the same in its construction and operation as the parallel motion mechanism at the left side of the welt lifter and will be understood from the foregoing description. The illustrated welt lifter 94 is arranged in contiguous relation to the upper surfaces of a pair of outer heel forms or molds 116. In order to insure the entrance of the welt lifter into the welt crease of a prewelt upper in the machine the arm 110 and the corresponding arm at the right side of the welt lifter are made extensible to cause the welt lifter to remain in contiguous relation to the upper surfaces of the outer forms until it has come into engagement with the upper attaching surface of the welt. As illustrated in Fig. 13, the arm 110 comprises a pin 118 having at its lower end an eye 119 which is pivotally mounted on a headed screw 120 at the forward end of the link 102. The pin 118 is mounted to slide through a bore in a cylindrical member 122 having a rearwardly extending ear 124 which is pivotally mounted on the screw 112. The upper end portion of the pin 118 is threaded to receive a nut 128 which is adjustable to cause the welt lifter 94 to advance in contiguous relation to the upper surfaces of the outer forms 116 during that portion of its stroke when it is moving under the outer margin of the welt. After the welt lifter engages the welt the nut 128 engages the cylinder 122 and the welt lifter moves forwardly with an upward component which brings it into its position shown in Fig. 9 at the end of its welt lifting operation. In order to insure the engagement of the welt lifter with the upper attaching face of the welt without deforming the welt by engagement with its outer edge face the top margin of the inner or concave portion of the welt lifter is beveled to provide a relatively sharp edge therein. The welt lifter is advanced by the application of fluid pressure to a piston 130 (Fig. 3) mounted in a fixed cylinder 132. The piston is provided with a piston rod 134 which extends forwardly therefrom and carries at its forward end a crosshead 136. Fixed to the left end portion of the crosshead is a link 138 which extends forwardly from the crosshead (Fig. 7) and is pivotally connected to the lower end of the lever 106. A similar link 140 (Fig. 3) is fixed to the right end portion of the crosshead and is pivotally connected at its forward end to the lower end portion of a lever 142 (Fig. 2) corresponding to the lever 106. The advancement of the welt lifter is terminated by the engagement of the outer forms 116 with the back seam portion of a prewelt upper in the machine. At the limit of its advancement the welt lifter is located in its position shown in Fig. 9 with its concave edge substantially adjacent to the welt attaching seam of the upper. The upward component of movement of the welt lifter swings the outer portion of the welt upwardly into its position shown in Fig. 9 in which it has a slight inclination upward from its inner edge face.

Figure 15:
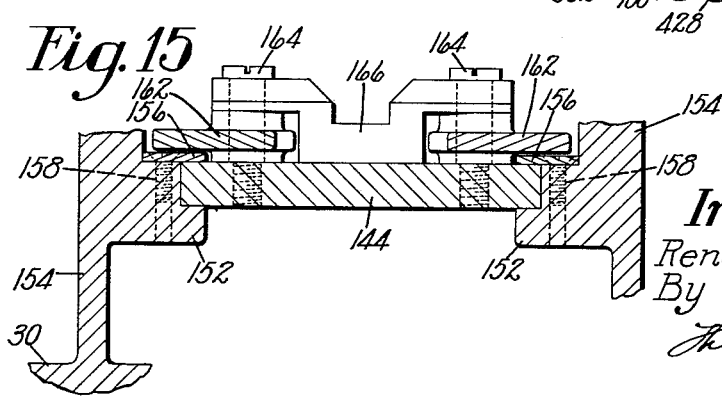
Fig. 15 is a section on the line XV—XV of Fig. 3.

For mounting the outer forms 116 the illustrated machine is provided with a slide 144 (Figs. 9 and 15). At its forward end the slide is provided with two spaced parallel bosses 146 (Fig. 3) the forward ends of which extend beyond the forward end face of the slide and are made convex, as seen in plan in Fig. 3. The forward end portions of the bosses are positioned respectively in recesses 148 (Fig. 10) in the outer forms 116. For mounting the outer forms on the forward portions of the bosses, respectively each form carries a headed pin 150 (Fig. 9) which extends through a vertical bore in the boss. As shown in Fig. 15, the slide 144 is mounted for horizontal movement forwardly and rearwardly of the machine in the rabbeted portions of rails 152 extending inwardly from the opposite side portions of vertical walls 154 extending upwardly from the top of the standard 30. The slide is held against upward movement from the rails 152 by gibs 156 secured thereto by screws 158. To provide clearance for the operation of the connecting rod 72 (Fig. 9) extending upwardly from the piston 68 the slide 144 has a suitable opening 160 formed in its rear portion and extended longitudinally of the slide to the extent required to accommodate the movement of the slide on the rails. For pressing the outer forms 116 inwardly against the opposite sides of the heel end portion of an upper in the machine a pair of levers 162 (Figs. 3 and 15) are carried by the slide 144 and are pivotally mounted substantially midway between their ends on headed screws 164 the lower ends of which are mounted in the slide 144 and the headed upper ends of which are mounted in the outwardly extending portions of a bracket 166 fixed to the slide. The forward end portion of each of the levers 162 is bifurcated to receive a roll 168 (Fig. 7) pivotally mounted on a headed pin 170 and arranged to engage a leaf spring 172 secured by a headed screw 174 (Fig. 10) to the outer side face of the form 116. The forward portion of the spring 172 is bent inwardly and rearwardly into a generally U-shaped form and its free end portion is seated on the base of a groove 176 extending inwardly from the outer side face of the form at its forward end portion. In the operation of the machine the forward portions of the levers 162 move toward each other to cause the rolls 168 to apply pressure to the springs 172 thereby to cause the forms 116 to apply molding pressure to the opposite sides of the heel end portion of a prewelt upper in the machine. For actuating the levers 162 the crosshead 136 carries a yoke 178 (Fig. 7). Pivotally mounted on a headed screw 180 extending through the yoke are two arms 182 and 184 (Fig. 3) arranged to form a toggle connecting the crosshead 136 to the rear end portions of the levers 162. In order to provide for the molding of the back line portion of the upper by the action of the piston 130 the forward ends of the yoke 178 are arranged to engage a head 186 at the rear end of the slide 144 during the latter part of the advancement of the yoke. Thus it will be seen that the fluid pressure applied to the piston 130 is transmitted positively and directly to the outer forms 116 through the yoke 178 and the slide 144. The force of the pressure fluid in a rearward direction in the cylinder 132 is taken by a head 188 (Fig. 3) which has a cylindrical portion mounted in the cylinder 132 and an outwardly extending flange 190 through which extend a plurality of tie rods 192 each of which is provided with a clamping nut 194 arranged to engage the rear face of the flange. The tie rods extend forwardly through suitable bores in the outwardly extending flange of a head 196 mounted in the forward portion of the cylinder 132 extend forwardly from said head to the front of the machine where they are secured by clamping nuts 198 (Fig. 7) which bear against a plate 200 fixed to the machine frame. The rear portions of the tie rods extend through sleeves 202 positioned between the head 188 and the head 196 and those portions of the tie rods extending forwardly from the head 196 extend through sleeves 204 positioned between the head 196 and the plate 200. Thus it will be seen that the tie rods 192 not only take the rearward force of the fluid pressure in the cylinder 132 but also hold the heads 188 and 196 in assembled relation to the cylinder and rigidly mount the assembly relatively to the machine frame. To support the weight of the cylinder 132 the upper tie rods 192 extend through two lugs 193 extending downwardly from a horizontal plate 195 fixed to the machine frame.

Figure 3:
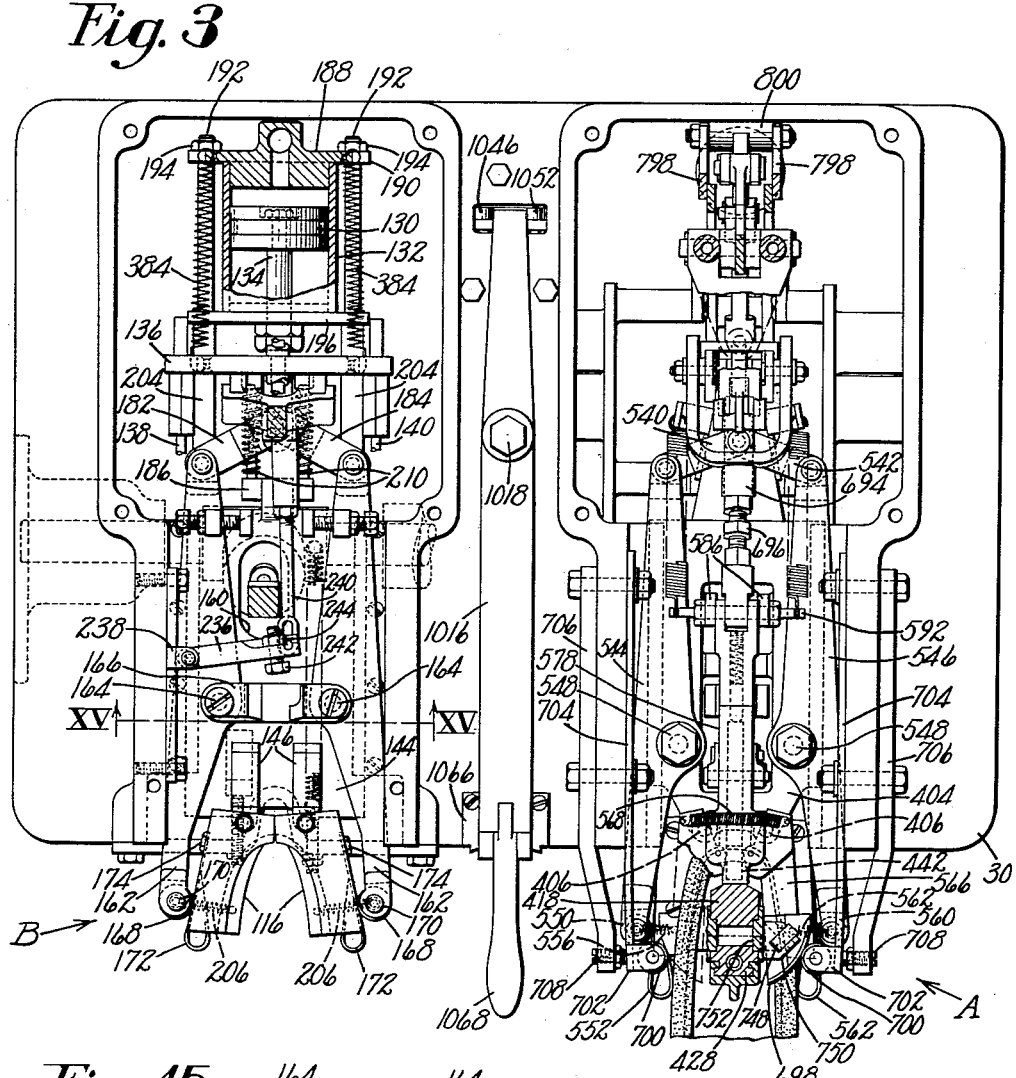
Fig. 3 is a plan view similar to Fig. 2 with certain mechanisms at the top of the machine broken away in order to illustrate the underlying mechanisms.

When the machine is at rest the outer heel forms 116 are yieldingly held in their outspread position shown in Fig. 3 by two springs 206 which are connected at their inner ends to pins 208 (Fig. 1) extending downwardly from the outer forms and at their outer ends to downward extensions of the pivot pins 170. The springs 206 hold the forms in a position determined by the engagement of the springs 172 carried by the forms with the rolls 168 at the forward ends of the levers 162. During the first part of the machine cycle the levers 162 advance the outer forms 116 to take up the space between the outer forms and the opposite sides of the heel end portion of a prewelt upper mounted on the inner heel form 34, such movement of the outer forms occurring while the slide 144 is stationary. As the levers 162 continue their action on the outer forms to cause said forms to apply pressure to the opposite sides of the heel end portion of the upper, the slide 144 is yieldingly advanced to move the outer forms forwardly in order to wipe the upper toewardly upon the inner heel form 34. Such yielding advancement of the outer forms is effected by the action of the crosshead 136 (Fig. 3) on two springs 210 the rear end portions of which are mounted on pins 212 (Fig. 7) mounted in ears 214 extending downwardly and forwardly from the crosshead 136 and the forward portions of which are mounted on pins 216 extending rearwardly from a downward extension 218 of the head 186 at the rear end of the slide 144. When the machine is at rest the spacing between the downward extension 218 and the ears 214 is equal to the length of each spring 210 plus an increment which affords a measured lost motion of the crosshead 136 relatively to the slide 144 while the outer forms 116 are being advanced by the levers 162 into engagement with the outer surfaces of the heel end portion of the upper.

The illustrated welt pressers 96 are pivotally mounted between their ends on pins 220 (Figs. 10 and 17) mounted in ears 222 projecting outwardly from parallel arms 224 projecting forwardly from a head 226 pivotally mounted on a cross pin 228 carried by a pair of arms 230 (Fig. 9) extending downwardly from the lever 44. The cross pin 228 extends through short vertical slots 229 in the arms 230 and the head is yieldingly held at the limit of its upward movement relatively to the cross pin, as shown in Fig. 9, by two springs 232 (Figs. 8 and 10) which have their lower ends connected to the outwardly extending end portions of the cross pin and their upper ends connected to opposite end portions of the pins 50 projecting outwardly from the arms 230. This construction of the mechanism mounting the welt pressers permits the pressers to adjust themselves to the level of the welt of the supported upper and to apply uniform pressure to the welt about the entire extent of the heel portion of the welted margin of the upper. To provide for the application of relatively light pressure to the welt pressers 96 and 98 during the movement of the lever 44 in a clockwise direction as seen in Fig. 17, one of the parallel arms 224 has a threaded pin 342 mounted in an ear 344 extending outwardly from the arm and the lever 44 carries a spring-pressed plunger 346 which is constructed and arranged to engage the rounded upper end of the pin 342 during the clockwise movement of the lever. The plunger 346 is slideably mounted in a bore in the lower end of a boss 348 projecting outwardly from the lever 44. At its upper end the plunger 346 has a head 350 which is normally seated against the base of a counterbore 352 formed in the boss. The counterbore is threaded to receive a screw 354 which has in its lower portion a socket 356 in which is mounted a spring 358 which extends downwardly from the screw into a socket 360 in the plunger 346. During the latter part of the clockwise movement of the lever 44 the outwardly projecting margin of the welt engages the upper extremities of the outer forms 116 which positively resist further downward movement of the upper. Further movement of the lever 44 after the welt engages the outer forms 116 causes a relative movement of the lever and the parallel arm 224 thus compressing the spring 358 whereby a relatively light pressure is applied by the welt pressers to the welted margin of the upper. The degree of pressure thus applied to the welted margin may be varied by adjusting the screw 354 in the boss 348. For advancing the welt pressers inwardly toward each other in order to bend or wipe the welted margin inwardly over the heel form 34 the illustrated machine is provided with an arm 236 (Figs. 3 and 10) which is pivotally mounted at its outer end in a fixed bracket 238. Referring to Fig. 3, the arm 236 is actuated by the piston 130 through connections including an arm 240 mounted on the crosshead 136 for swinging movement in a horizontal plane and having at its forward end a pin-and-slot connection to the free end of the arm 236. Mounted in the free end portion of the arm 236 is a headed screw 242 which is secured in adjusted position in the arm by a lock nut 244. Referring to Figs. 9 and 10, the head of the screw 242 is in constant engagement with an ear 246 projecting upwardly from the rear end of a slide 248 mounted in ways in the parallel arms 224 for movement toward and from the heel end of a shoe in the machine. At its forward end the slide 248 is provided with an open ended slot in which are mounted two toggle links 250 and 252 the inner end portions of which are reduced to form a halved joint through which extends a headed pivot pin 254 carried by the slotted end portion of the slide. At their outer ends the toggle links 250 and 252 are pivotally connected respectively to the welt pressers 96. When the piston 130 is retracted the welt pressers are swung outwardly into their retracted position by the expansion of a spring 256 (Fig. 9) mounted in a socket in the head 226 and arranged to bear against the forward surface of the ear 246 projecting upwardly from the slide 248.

Referring to Fig. 11, the welt presser 98 is arcuate in shape and has an outer surface which is semicircular and a wiping edge 258 which is generally complemental to the periphery of the heel end portion of a prewelt upper in the machine. The illustrated welt presser, as shown in Fig. 9, is of substantial thickness and is formed integrally with a slide 260, the welt engaging portion of the welt presser being offset downwardly from the slide. The slide 260 is mounted for movement lengthwise of an upper in the machine in ways in the forward portions of the parallel arms 224. The initial advancement of the slide 260 is effected by the downward movement of the lever 44 which acts through a link 262 and a lever 264 to impart forward movement to the slide. The link 262 is cylindrical in shape and has mounted on its rear portion a sleeve 276 (Fig. 16) formed integrally with a shank portion 278 and a hexagonal head 279. The head and shank are internally threaded for engagement with the threaded end portion of the link 262 and the sleeve 276 is counterbored for sliding engagement with the link. The sleeve is slidably mounted in a diametrical bore in a cross pin 266 mounted for swiveling movement in a pair of ears 268 (Fig. 9) projecting upwardly with a forward inclination from the cross head 54. At its forward end the link 262 is pivotally connected to the upper end portion of the lever 264 and the lever is pivotally mounted midway between its ends on a pin 270 mounted in ears 272 projecting forwardly from a head 274 at the forward end of the slide. During the movement of the lever 44 in a clockwise direction, as seen in Fig. 9, the link 262 moves downwardly with a forward component thus causing the sleeve 276 to slide through the cross pin 266. Such forward sliding movement is arrested at an intermediate point in the clockwise movement of the lever 44 by the engagement of the shank portion 278 with a slabbed off surface of the cross pin 266. After the forward movement of the link 262 has been arrested further clockwise movement of the lever 44 causes the lever 264 to move in a counterclockwise direction, as seen in Fig. 9. During such movement of the lever 264, its lower end engages a roll 280 pivotally mounted on a cross pin 282 carried by two parallel ears 284 extending forwardly and downwardly from the forward ends of the slide 260. The operation of the lever 264 advances the welt presser 98 into a position over the welted margin of the upper before the welt lifter begins to operate. As shown in Fig. 11, the slide 260, which carries the welt presser, is cut out on a line 286 to provide space for the head 274 (Fig. 10) and also to provide clearance for the forward movement of the slide during the advancement of the welt presser. The final advancement of the welt presser 98 to wipe the welted margin inwardly over the heel form 34 is effected by the operation of the piston 130 and to that end the slide 248, which is operated by the piston, as hereinbefore described, is provided with a forward extension 288 of reduced thickness the forward end of which is arranged to engage the rear end wall 290 of the slide 260.

In order to bend the welted margin at the heel portion of a prewelt upper in the machine over the heel form 34 and to press the margin of the upper downwardly against the beveled face 38 of the heel form with substantial force, a pair of rolls 292 are constructed and arranged to operate on the upper surface 294 of the head 274, said upper surface being inclined upwardly in a forward direction to cause the rolls 292 to exert a cam action against the head 274 to move it downwardly. The downward movement of the head 274 is transmitted to the welt pressers 96 through ears 296 (Fig. 10) projecting outwardly from the parallel arms 224 and having their bottom surfaces arranged to engage the upper surfaces of the welt pressers. The rolls 292 are pivotally mounted on a cross pin 298 mounted in the lower end portion of a lever 300. The lever is pivotally mounted on a cross pin 302 fixed in parallel ears 304 projecting forwardly from the upward extension 62 of the lever 44. The upper end portion of the lever is pivotally mounted between lugs 306 extending forwardly from a head 308 mounted in a cylinder 310 having a reduced rear portion the end of which is bored to receive a plunger 312 (Fig. 7). The plunger has an elongated head 314 in which is formed a longitudinal slot 316. Mounted in the slot is a headed pin 317 carried by the bifurcated upper end portion of a lever 318 pivotally mounted on a cross pin 320 fixed in the upper end portions of the plates 86. The bifurcated lower end portion of the lever 318 carries two rolls 322 which engage the front face of the cross head 136. In the operation of the machine the pin 317 in the bifurcated upper end portion of the lever 318 moves longitudinally of the slot 316 to a limit determined by the engagement of the pin with an abutment screw 326 mounted in the rear end portion of the head 314 and secured in adjusted position by a locknut 328. During the downward movement of the lever 44 the cylinder 310 and the plunger 312 are moved forwardly as a unit until the abutment screw 326 comes into contact with the pin 317. During the operation of the piston 130 the lever 318 is swung in a counterclockwise direction, as seen in Fig. 7, and operates through the plunger 312 and the cylinder 310 to swing the lever 300 in a counterclockwise direction thereby to actuate the rolls 292, as hereinbefore described. In order to provide for a yielding action of the rolls 292 the plunger 312 acts on the cylinder 310 through a spring 330 which surrounds the reduced forward end portion 332 of the plunger. The rear end of the spring engages a washer 334 which bears against a shoulder 340 at the rearward extremity of the forward extension 332 of the plunger and the forward end of the spring engages a washer 336 mounted on the reduced end portion of the plunger and positioned between the spring 330 and a nut 338 mounted on the threaded forward end portion of the plunger. In the operation of the plunger by the lever 318 the spring 330 moves bodily with the plunger until the washer 334 engages the shoulder 340. Further movement of the plunger thereafter compresses the spring 330 to actuate the rolls 292.

In the operation of the heel station of the illustrated machine the heel end portion of a prewelt upper is mounted on the heel form 34 after first creasing the upper manually at the back seam to facilitate the centering of the back seam relatively to the heel form. The upper is positioned heightwise thereof on the heel form 34 by bringing the inner edge of the welt into contact with the bottom surface of a flange 362 (Fig. 14) extending inwardly from the welt pressers 96. After so locating the upper the operator depresses a treadle 364 (Fig. 1) to initiate the operation of the heel station of the machine. The depression of the treadle opens a pressure fluid line to the cylinder 70 (Fig. 7) and thus actuates the piston 68 to swing the lever 44 in a clockwise direction thereby advancing the inner form 34 and the welt pressers from their position shown in Fig. 7 to their position shown in Fig. 9, which is determined by a stop screw 388 mounted in an ear 390 projecting upwardly with a rearward inclination from the crosshead 54. During the clockwise movement of the lever 44 the lever 264 swings in a counterclockwise direction to advance the welt presser 98 into its position over the welted margin of the upper, shown in Fig. 9. Also during the clockwise movement of the lever 44 a spring 366 holds the plate 144 in its position shown in Fig. 7, said position being determined by the engagement of a lug 368 extending downwardly from the plate 144 with an abutment screw 370 mounted in the plate 200. In the course of its downward movement the inner form 34 engages the upper extremities of the outer forms 116 and moves them bodily in a rearward direction against the tension of the spring 366, thus causing the outer forms to exert an upwiping operation on the upper and ensuring the entrance of an internal flange 372 (Fig. 14) at the upper extremities of the outer forms into the welt crease of the upper. Upon the completion of the clockwise movement of the lever 44 the machine comes to rest. During this portion of the machine cycle the treadle 364 has been held depressed by the operator. Upon release of the treadle a spring 374 (Fig. 5) returns the treadle to its elevated position and causes a microswitch 376 to actuate a solenoid 378 which operates a valve body 380 to bring fluid pressure to bear against the piston 130 (Fig. 3). The advancement of the piston operates first to close the outer forms 116 on the heel end portion of the prewelt upper mounted on the inner form 34. Concomitantly the side pressers 96 are swung toward each other into a position over the welted margin of the upper and preliminary downward pressure is applied to the welt pressers by the actuation of the rolls 292. At the completion of the application of such preliminary pressure to the welt pressers the yoke 178 (Fig. 7) has come into contact with the head 186 at the rear end of the slide 144. Continued pressure of the piston 130 thereafter brings direct and positive pressure to bear against the head 186, such pressure being transmitted through the slide 144 to the outer forms 116. Concomitantly with the positive pressure against the outer forms the rolls 292 apply their maximum downward pressure against the welt pressers 96 and 98.

The upper remains under pressure in the heel station while another prewelt upper is mounted in the toe station. A treadle 942 (Fig. 5) is then depressed to initiate the operation of the upper shaping instrumentalities in the toe station. After a preliminary operation of the toe station the treadle is permitted to move upwardly. Such upward movement of the treadle opens the microswitch 376 (Fig. 4), breaking the electrical circuit through the solenoid 378 and permitting a spring 382 to operate the valve 380 in order to close the pressure line to the cylinder and to open an exhaust line. Thereupon two springs 384 return the piston 130 to its rest position shown in Fig. 3. Upon the release of the detent 78 by the operation of a handle 386 extending upwardly from the lever 90, or by the operation of automatic mechanism hereinafter described, the spring 58 returns the lever 44 to its position shown in Fig. 7.

Figure 18:
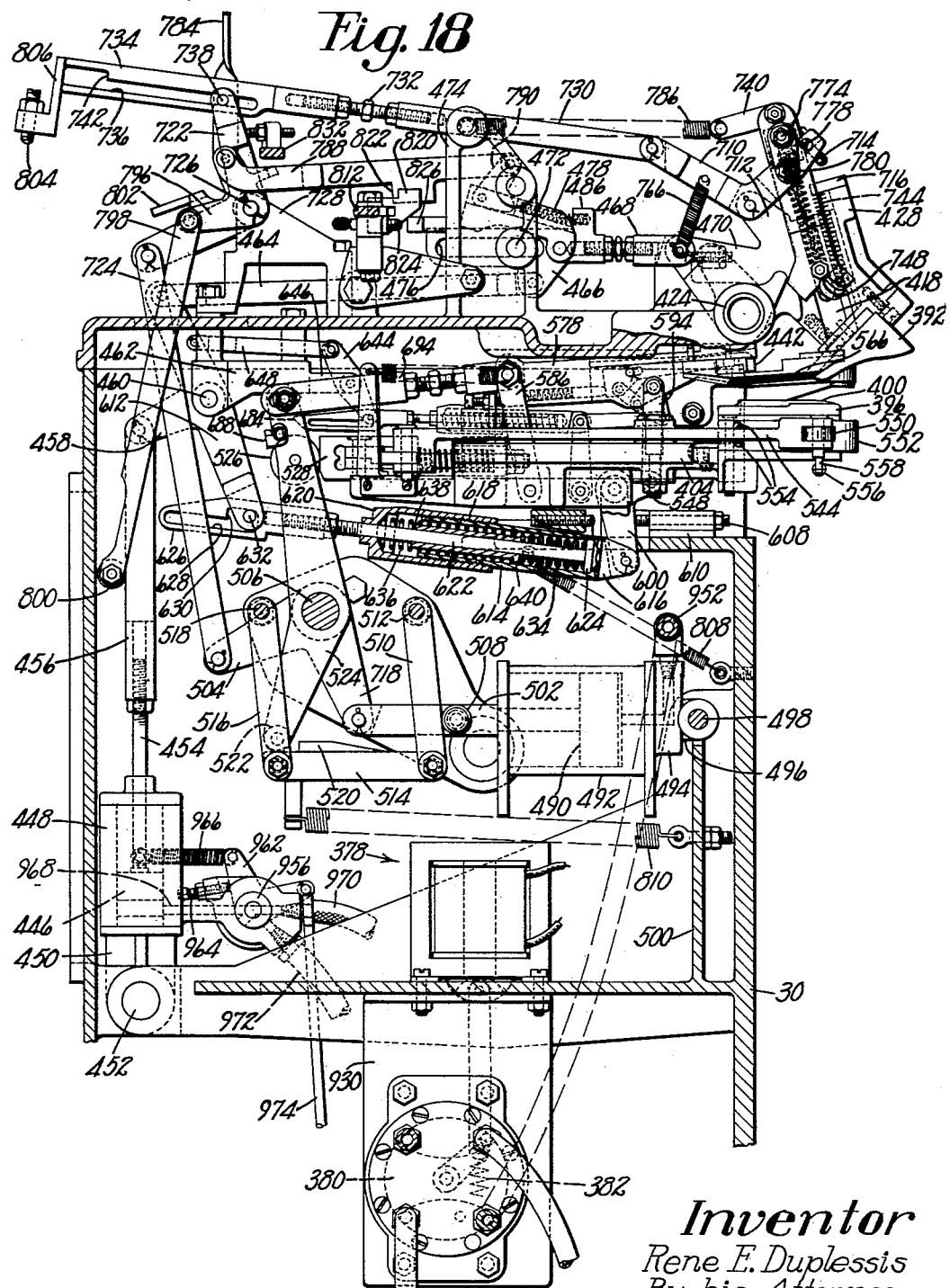
Fig. 18 is a side elevation, partly in section on the line XVIII—XVIII of Fig. 1.
Figure 19:
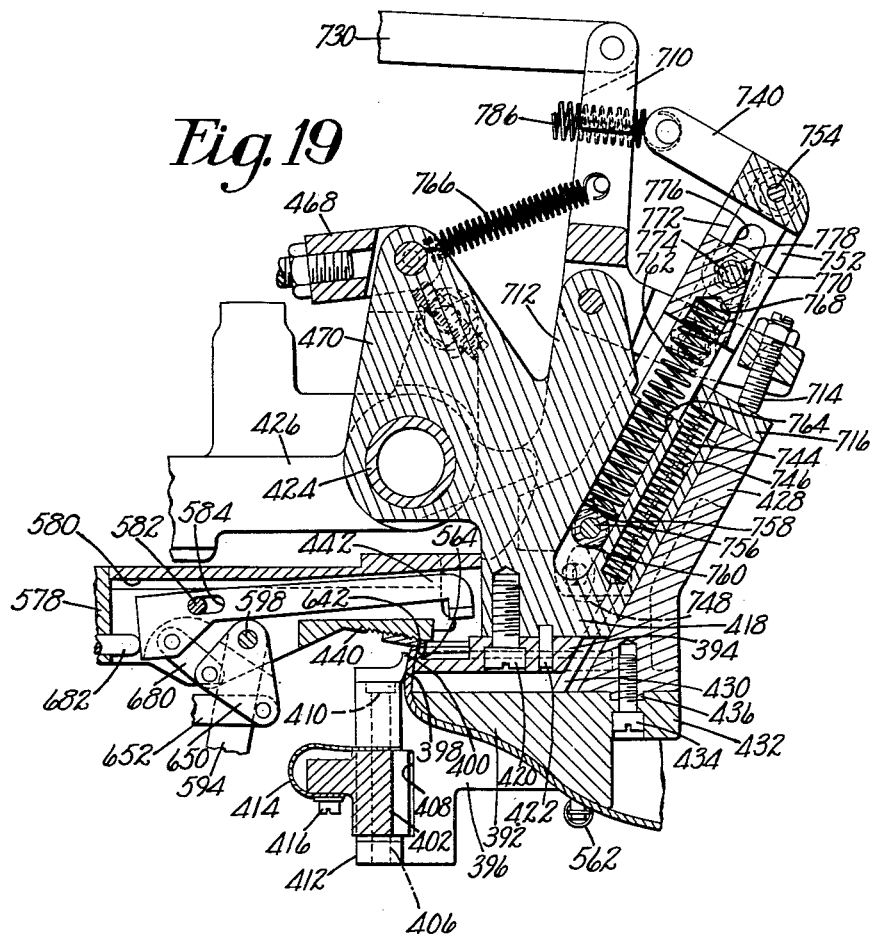
Fig. 19 is a section on a vertical plane extending from front to back through the center of the toe station with the parts in their respective positions when the upper is under pressure.

For shaping the toe portion of a prewelt upper the illustrated machine is provided with a toe form or expander 392 which, as shown in Figs. 18 and 19, is constructed and arranged to engage the inner surface of a prewelt upper and is operable to expand the toe portion of the upper while the upper is held along a line adjacent to the welt attaching seam between a plate 394 constructed and arranged to engage the inner surface of the upper and outer forms 396 constructed and arranged to engage the outer surface of the upper and grip it against the edge face of the plate 394. The plate 394 is bilaterally symmetrical and has the general shape of the toe portion of the bottom of a prewelt shoe and the upper engaging edge face 398 (Fig. 19) of each of the outer forms 396 is shaped complementally to the upper engaging edge face of the plate 394. For supporting the toe portion of a prewelt upper in the machine until the outer forms 396 have closed on the upper to grip it against the edge face of the plate 394 each of the outer forms has a lip 400 extending upwardly from its upper engaging edge face and arranged to support the upper by engagement thereof in the welt crease. The lip is tapered to facilitate its entrance into the welt crease and is rounded at its extremity to obviate damage to the upper or the welt. Referring to Fig. 19, the outer forms 396 are mounted on two ears 402 extending forwardly from a hollow slide 404 (Fig. 18) mounted for forward and rearward movement in suitable ways in the machine frame. As shown in Fig. 19, each of the ears is extended vertically to provide an adequate mounting for a pivot pin 406 extending through suitable bores in the outer forms. Each of the ears 402 extends into an arcuate recess in the outer form. At its upper end each of the pins 406 has a head 410 which is seated in a counterbore in the outer form and at its lower end each pin is mounted in a bore in an ear 412 projecting from the outer form. As shown in Fig. 19, the ear 402 in the slide 404 is spaced slightly from the ear 412 in the outer form. When the machine is at rest each outer form is supported at the limit of its upward movement relatively to the ear 402 by a leaf spring 414 secured to the bottom surface of the slide 404 by a headed screw 416 and extending upwardly in an arc through a suitable opening in the slide and forwardly horizontally to locate its bifurcated free end portion between the upper surface of the ear 402 and the adjacent surface of the outer form with its bifurcations embracing the pivot pin 406. The spring 414 urges the outer form 396 upwardly into a position determined by the engagement of the ear 412 with the bottom surface of the ear 402. In this position each outer form is offset upwardly from its gripping position shown in Fig. 19 to the extent of the space between the ear 402 and the ear 412. The outer forms remain in their elevated position until means hereinafter described engages the welted margin of the upper and moves the welted margin together with the outer forms downwardly to the limit of the downward movement of the outer forms relatively to the ears 402. The plate 394 is secured to the plane bottom surface of a head 418 by a headed screw 420 the head of which is seated in a counterbore in the plate, and the plate is oriented relatively to the head 418 by a dowel pin 422 mounted in the plate and seated in a socket in the head. The head 418 is pivotally mounted on a cross shaft 424 fixed in forward extensions of the frame one of which is identified by the numeral 426 in Fig. 19. Preferably the shaft is bored longitudinally for the reception of a heating unit (not shown). The inner toe form 392 is carried by a slide 428 which has a T-shaped tongue 430 which slides in a complementally shaped grooves in the head 418. To provide for its attachment to the slide the toe form 396 has a forwardly extending ear 432 which is drilled and counter-bored to receive a headed screw 434 which removably attaches the form to the slide. To provide for the proper orientation of the toe form 392, the slide 428 has a downwardly extending tongue 436 which seats in a groove in the toe form.

For swinging the head 418 in clockwise direction, as seen in Fig. 18, to advance the toe form 392 and the plate 394 into the toe portion of a prewelt upper supported on the outer forms 396, the illustrated machine is provided with a piston 446 mounted in a cylinder 448. For mounting the cylinder a standard 450 extends downwardly from the base of the cylinder and is pivotally mounted on a fixed cross shaft 452. Extending upwardly from the piston is a piston rod 454 which has fixed to its upper end portion an arm 456. The upper end of the arm is pivotally connected to the rearwardly extending arm of a bell crank lever 458 mounted on a cross shaft 460 in a fixed member 462. The upper end of the bell crank lever 458 is connected by a link 464 to the downwardly extending portion of an irregularly shaped block 466 (Fig. 21) which is connected by an adjustable link 468 to an arm 470 extending upwardly from the head 418. For mounting the block 466 for forward and rearward movements a cross pin 472 is fixed in upwardly extending portions 474 (Fig. 18) of the machine frame and arranged to extend through a longitudinal slot 476 formed in the block. Upon the completion of the forward movement of the link 468 a latch member 478 carried by the block 466 swings downwardly into position to engage the cross pin 472 in order to hold the head 418 against return movement. Referring to Figs. 21 and 22, the latch member comprises two parallel side pieces, said side pieces being connected together by a crosshead 480. The latch member straddles the block 466 and is pivotally mounted at its forward end on a pin 482 mounted in the block. The latch member 478 is advanced into latching position by a spring 484 which swings the latch member in a counterclockwise direction, as seen in Fig. 21. The spring has its rear portion mounted in a socket in the crosshead 480 and its forward portion mounted in a socket formed in a lug 486 projecting upwardly from the forward portion of the block 466. During the operation of the outer forms 396 to grip the upper against the plate 394 carried by the head 418 the head is pivotally held against return movement by the engagement of the latch member 478 with the cross pin 472.

For advancing the slide 404 to cause the outer forms 396 to grip the upper against the end portion of the plate 394 a piston 490 is mounted in a cylinder 492 and is urged to the left, as seen in Fig. 18, by the application of fluid pressure thereto. For mounting the cylinder 492 a head 494 at the forward end of the cylinder is provided with forwardly extending lugs 496 mounted on a cross shaft 498 at the upper end of a frame section 500. Extending rearwardly from the piston 490 is a piston rod 502 which is pivotally connected to the downwardly extending arm of a bell crank lever 713 which fulcrums on a fixed shaft 506. The piston rod 502 carries on opposite sides thereof a pair of rolls 508 which engage the forward surfaces of a pair of swinging arms 510 having a fixed fulcrum 512. A horizontal link 514 connects the lower ends of the arms 510 to the lower ends of a pair of swinging arms 516 having a fixed fulcrum 518 and forming with the link 514 and the arms 510 a parallel motion mechanism. Extending upwardly from the link 514 is a wedge-shaped boss 520 the vertical rear surface of which is arranged to engage a roll 522 on a bent lever 524 at an early stage in the operation of the piston 490. The bent lever is fulcrumed at its elbow on the shaft 506 and receives a measured movement in a clockwise direction, as seen in Fig. 18, from the rearward movement of the wedge member. At a predetermined point in the rearward movement of the wedge member the roll 522 rides upwardly off the vertical surface of the boss 520 and into engagement with the inclined surface of the boss. During the continued operation of the piston 490 thereafter the bent lever 524 is held in its advanced position without further operation by the engagement of the roll 522 with the inclined surface of the boss. For advancing the slide 404 to bring the outer forms 396 into gripping engagement with the toe end portion of a prewelt upper in the machine, the bent lever 524 has pivotally mounted in its upper portion a roll 526 which, as shown in Fig. 20, engages the rear end surface of a hollow block 528 slidably mounted in a guideway in the recessed rear portion of the slide 404. The forward movement imparted to the hollow block 528 by the roll 526 is transmitted to the slide 404 through a spring 530 mounted on a stem 532 fixed in and projecting forwardly from the block 528 and slidably mounted at its forward end in a bore extending through a cross section 534 of the slide. The forward portion of the spring 530 is seated in a counterbore 536 in the cross section 534. The normal rest position of the hollow block 528 is adjustably determined by the engagement of a nut 538 on the threaded forward portion of the stem 532 with the forward wall of the cross section 534.

For closing the outer forms 396 on the upper to grip the opposite side portions of the upper against the plate 394 the hollow block 528 carries two toggle links 540 and 542 which, as shown in Fig. 3, are pivotally connected to the rear ends of a pair of levers 544 and 546 which are fulcrumed on headed screws 548 mounted in the slide 404. Mounted in the bifurcated forward portion of the lever 544 is a roll 550 constructed and arranged to engage a leaf spring 552 secured by screws 554 to the outer wall of the upper engaging form 396. The forward portion of the spring is bent inwardly and rearwardly and seated in a groove formed in the outer wall of the form. The roll 550 is held in contact with the spring 552 at all times by a spring 556 one end of which is mounted on a downward extension of a pin 558 on which the roll rotates and the other end of which is anchored to a pin projecting downwardly from the form 396. The lever 546 at the right side of the upper is provided with a roll 560 (Fig. 3) corresponding to the roll 550 and the outer form 396 at the right side of the shoe is provided with a leaf spring 562 corresponding to spring 552. In the operation of the machine the hollow block 528 advances the slide 404 and the levers 544 and 546 as a unit until the outer forms engage the toe end portion of the upper thereby arresting the advancement of the slide. Thereafter the hollow block advances relatively to the slide 404 and actuates the toggle links 540 and 542 to cause the levers 544 and 546 to close the outer forms on the supported upper. During the initial advancement of the outer forms to bring them into engagement with the toe end of the upper the forms are held in their outspread position by the spring 556 and the corresponding spring at the right side of the shoe.

For moving the welted margin of the upper downwardly into its initial position heightwise thereof in the machine and for bending the welted margin inwardly over the plate 394 and clamping it against a lip 564 (Fig. 19) projecting upwardly from the edge of the plate the illustrated machine is provided with a central welt presser or wiper 440 (Fig. 23) and two welt pressers or wipers 566 constructed and arranged to engage the welted margin at opposite sides of the toe portion of the upper. When a prewelt upper is mounted in the machine it assumes a position relatively to the upwardly extending lip 400 of the outer form 396 substantially as shown in Fig. 20 with the adjacent margins of the welt and the upper directed upwardly and seated against the bottom surface of the reduced margin 444 of the central welt presser 440. The side pressers 556 at this time are held in their open position out of engagement with the welted margin of the upper throughout the greater portion of their length by a spring 568 (Fig. 23) anchored to pins 570 projecting upwardly from rearward extensions 572 of the side pressers. To provide for the pivotal mounting of the side pressers 566 on the central welt presser 540 each of the side pressers has an inwardly extending ear 574 which is bored to receive a pin 576 mounted in a forward corner of the presser 440. Referring to Fig. 20, the welted margin, at an early stage in the operation of the machine, is gripped between a shoulder 438 formed in the welt presser 440 and constructed and arranged to engage the inner margin of the outsole attaching surface of the welt and a gripper member 442 constructed and arranged to engage the bottom margin of the foot facing surface of the upper. The central welt presser 440 is fixed to the bottom surface of an arm 578 and the gripper member 442 is mounted in a recess or channel 580 formed in a forward portion of the arm 578 and is arranged to overlie the welt presser. The gripping surface of the member 442 is formed in the downturned forward end portion thereof which is arranged adjacent to the reduced margin 444 of the welt presser 440. For mounting the gripper member 442 a cross pin 582 is fixed in the arm 578 and arranged to extend through the channel 580 and through a longitudinal slot 584 formed in the gripper member. The arm 578 is mounted on a parallel motion mechanism comprising two arms 586 projecting upwardly from a common hub 588 which is pivotally mounted on a cross pin 590 mounted in and extending through the hollow portion of the slide 404 which mounts the outer forms 396. The upper portions of the arms 586 carry a cross pin 592 which extends through suitable bores in the bifurcated rear end portions of the arm 578. To complete the parallel motion mechanism a pair of arms 594 extend upwardly from a crosshead 596 and are pivotally mounted at their upper ends on a cross pin 598 mounted in and extending through the channeled portion of the arm 578. The arms 594 are carried by a bell crank lever 600 fulcrumed on a cross pin 602 mounted in and extending through the hollow portion of the slide 404 and having at the end of its horizontal arm a pin 604 which extends through a pair of ears 606 projecting downwardly from the crosshead 596. When the machine is at rest the welt pressers are elevated above the outer forms 396, as shown in Fig. 18 in order to permit the introduction of the toe portion of a prewelt upper into the machine and the location of its welted margin on the upwardly extending lip 400 of the outer forms 396, as shown in Fig. 20. This position of the welt pressers is adjustably determined by the engagement of the vertical arm of the bell crank lever 600 with an abutment screw 608 mounted in a boss 610 on the machine frame. Similarly, the advanced position of the welt pressers illustrated in Fig. 20 is adjustably determined by the engagement of the vertical arm of the bell crank lever 600 with an abutment screw 609.

For moving the three welt pressers downwardly into engagement with the welted margin of a prewelt upper supported on the outer forms 396 the bell crank lever 458 (Fig. 18) has a downwardly extending arm 612 which is connected to the bell crank lever 600 by a link mechanism comprising a sleeve 614 which is open at its rear end and has at its forward end a head 616 pivotally connected to the end of the vertical arm of the bell crank lever 600. The rear portion of the sleeve 614 is externally threaded to receive an internally threaded sleeve 618 having at its rear end a head 620 which is bored at its center to receive the stem 622 of a plunger which extends through the two sleeves and has at its forward end a head 624 positioned adjacent to the head 616 of the sleeve 614. Mounted on the threaded rear portion of the stem 622 and extending rearwardly therefrom is an arm 626 having a slot 628 extending longitudinally thereof and widened at its forward portion to provide a shoulder 630. Mounted in the bifurcated lower end portion of the downwardly extending arm 612 of the bell crank lever 458 is a cross pin 632 which extends through the slot 628 and engages the shoulder 630 during the operation of the bell crank lever by the piston 446 thus moving the plunger 622 rearwardly or to the left as seen in Fig. 18. The rearward movement of the plunger is transmitted to the sleeve 618 through a relatively heavy spring 634 and a relatively light spring 636. The spring 634 surrounds the forward portion of the stem and bears against its head 624. The rear end of the spring 634 acts against the forward end of a sleeve 638 slidably mounted on the stem 622. The light spring 636 surrounds the sleeve 638 and is confined between an outwardly extending flange 640 at the forward end of the sleeve and the head 620 of the sleeve 618. The sleeve 618 is adjustable longitudinally relatively to the sleeve 614 in order to determine the space between the rear end of the sleeve 638 and the head 620. In the operation of the machine the bell crank lever 458 turns in a clockwise direction as seen in Fig. 18, moving the arm 612 rearwardly. After a preliminary lost motion the cross pin 632 in the arm 612 engages the shoulder 630 in the arm 626 moving the arm rearwardly. The entire linkage connected to the arm 626 moves rearwardly as a unit until the three welt pressers meet resistance to their downward movement by engagement with the welted margin of the upper in the machine. As the rearward movement of the arm 612 continues the plunger moves rearwardly through the sleeves 614 and 618 compressing the spring 636 in order to apply relatively light pressure to the welted margin in order to seat it against the upwardly extending lips 400 of the outer forms 396. The application of light pressure to the welted margin terminates with the engagement of the rear end of the sleeve 638 with the head 620 of the sleeve 618 and further operation of the arm 612 causes the application of relatively heavy pressure to the welted margin through the spring 634. The application of heavy pressure occurs after the toe form 392 has been advanced into the supported upper and the welt pressers have been advanced to bend the welted margin of the upper inwardly over the lip 564 projecting upwardly from the plate 394. Thus the application of heavy pressure to the welt pressers clamps the welted margin between the serrated bottom surfaces of the welt pressers and the upper edge of the lip 564 and holds the welted margin against movement relatively to the lip during the operation of the toe form 392 to expand and shape the toe portion of the upper. The welt pressers clamp the welted margin of the upper in its position relatively to the lip 564 shown in Fig. 19. In this position of the welted margin the welt attaching seam 642 is located substantially in alinement with the inner wall of the lip 564 and consequently no strain is exerted on the welt attaching seam 642 during the upper expanding operation.

For bringing the gripper member 442 into gripping engagement with the inner surface of the welted margin of the upper preparatory to the initial downward movement of the welted margin by the welt pressers a lever 644 (Fig. 18) is pivotally mounted midway between its ends on a forward extension 646 of the frame member 462. The lever 644 is swung in a clockwise direction, as seen in Fig. 18, by the bell crank lever 458 through a link 648 fulcrumed at its rear end on the upwardly extending arm of the bell crank lever and at its forward end at the upper extremity of the lever 644. Referring to Fig. 20, the clockwise movement of the lever 644 is transmitted to the gripper member 442 through a linkage extending from the lower end of the lever 644 to the lower end of a triangular lever or plate 650 the upper portion of which is fulcrumed on the cross pin 598. The illustrated linkage comprises a link 652 fulcrumed at its forward end on the lower portion of the triangular plate 650 and at its rear end on a pin 658 in the bifurcated upper end portion of an arm 654 pivotally mounted on a cross pin 656 carried by the slide 404 and extending through the hollow portion thereof. Also fulcrumed on the pin 658 is a head 660 at the forward portion of a sleeve 662, said head being positioned in the bifurcated rear portion of the link 652. The rear portion of the sleeve 662 is externally threaded to receive the internally threaded forward portion of a sleeve 664 having at its rear end a head 666 which is bored to receive a stem 668 of a plunger which operates in the sleeve 662. The head 670 of the plunger acts against a spring 672 surrounding the stem 668 and confined between the head 670 and the head 666. The rear portion of the stem 668 is threaded to mount an arm 674 extending rearwardly therefrom and provided with a longitudinal slot 676 through which extends a pin 678 mounted in the lower end portion of the lever 644. The forward portion of the slot 676 is extended upwardly to provide a shoulder against which the pin 678 operates. The triangular plate 650 is connected to the downwardly extending rear end portion of the gripper member 442 by a link 680 fulcrumed on the rear portion of the plate and in the downwardly extending portion of the gripper member. When the machine is at rest the gripper member is held at the limit of its counterclockwise swinging movement, as shown in Fig. 19, by a spring pressed pin 682 mounted in a longitudinal bore in the rear portion of the arm 578 and arranged to engage the lower portion of the rear end wall of the gripper member. In the rest position of the gripper member 442, as shown in Fig. 19, its free end portion is held at the limit of its upward movement by the spring pressed pin 682 and the cross pin 582 is engaged by the rear end wall of the slot 584. In the operation of the triangular plate 650 the gripper member 442 swings on the cross pin 582 until it comes into contact with the top surface of the welt presser member 440. Continued operation of the triangular plate 650 thereafter moves the gripper member 442 rearwardly into gripping engagement with the welted margin of the upper. After the upper is gripped between the outer forms 396 and the plate 394 the gripper member is disengaged from the welted margin of the upper and returned to its position shown in Fig. 19 preparatory to the forward movement of the welt presser 440. Such return movement of the gripper member is effected by the expansion of the spring 672 upon disengagement of the shoulder in the slot 676 (Fig. 20) from the pin 678. Such disengagement of the shoulder from the pin is effected by the engagement of a beveled surface 684 at the rear end of the arm 674 with an angle piece 688 fixed to the upper portion of the bent lever 524. Upon the disengagement of the shoulder from the pin the spring 672 expands to advance the plunger into position to engage the head 660 of the sleeve 662. Concomitantly with the advancement of the plunger by the spring 672 the spring pressed pin 682 moves the upper gripper member 442 forwardly to disengage it from the upper and after the rear wall of the slot 584 engages the pin 582 further advancement of the pin 682 swings the gripper member in counterclockwise direction, as seen in Fig. 20, to return the free end of the gripper member to its elevated rest position.

For advancing the central welt presser 440 to bend the welted margin of the prewelt upper in the machine inwardly over the lip 564 projecting upwardly from the plate 394 and to bring the welt presser into position to apply pressure to the inner margin of the welt, the bent lever 524 (Fig. 18) is extended upwardly beyond the roll 526 and carries at its upper end a headed pin 690 (Fig. 20) which extends through a longitudinal slot 692 in the rear end portion of a link 694. In order to provide for the adjustment of the welt presser 440 forwardly and rearwardly in accordance with the thickness of the welt to be operated, upon the link 694 comprises two sections connected by a turnbuckle 696 which is adjustable to vary the over-all length of the link. When the machine is at rest the position of the central welt presser 440 lengthwise thereof is determined by the engagement of the arms 586 with the forward wall of the cross section 534 of the slide 404. During the advancement of the slide 404 by the bent lever 524 the link 694 remains in its position relatively to the slide 404, shown in Fig. 20, the headed pin 690 moving forwardly through the slot 692 to an extent commensurate with the degree of angular movement of the bent lever. After the advancement of the slide 404 is arrested by the engagement of the upper with the plate 394, as shown in Fig. 19, further advancement of the bent lever 524 moves the hollow block 528 forwardly relatively to the slide 404 and brings the headed pin 690 into engagement with the forward wall of the slot 692 and advances the link 694 and the arm 586 to move the central welt presser 440 forwardly relatively to the outer forms 396 and into its welt pressing position. During the forward movement of the slide 404 the welt pressers 566 at opposite sides of the toe portion of the shoe are swung inwardly into welt pressing position by the engagement of the arcuate edge faces of cam plates 698 (Figs. 3, 23 and 24) fixed to the forward portions of the welt pressers with two rolls 700 respectively. Each of the rolls is pivotally mounted in a yoke 702 fixed to the forward end portion of a resilient plate 704 fixed to the machine frame. To provide for adjustment of the rolls 700 toward and from each other to vary the degree of advancement of the side welt pressers 566 inwardly over the welted margin of the shoe, two rigid arms 706 are fixed to the machine frame and have their forward end portions bent to converge forwardly, terminating abreast of the forward ends of the resilient plates. Each of the arms 706 has fixed in its forward end an abutment screw 708 constructed and arranged to engage the forward end portion of the resilient plate 704, said screw being adjustable in the arm 706 to vary the position of the roll 700 widthwise of the shoe.

For moving the toe form 392 downwardly and rearwardly after it has been advanced into its upper forming position a bell crank lever 710 (Fig. 18) is fulcrumed on an upward extension 712 of the head 418 and is provided with an adjustable abutment screw 714 arranged to engage a plate 716 at the upper end of the slide 428. The bell crank lever 710 is actuated by the piston 490 through connections comprising a bell crank lever 718 pivotally mounted on the shaft 506 and connected to the piston rod 502. The rearwardly extending arm 504 of the bell crank lever 718 is connected to the rearwardly extending arm of a bell crank lever 722 by a link 724. The bell crank lever 722 is fulcrumed on a pin 726 mounted in an upwardly extending portion 728 of the machine frame. The bell crank lever 722 acts on the bell crank lever 710 through mechanism comprising a link 730 fulcrumed on the rearwardly extending arm of the bell crank lever 710 and having threaded into a socket in its rear end the forward portion of a turnbuckle 732 the rear portion of which is mounted in a socket in the forward end portion of an arm 734 extending rearwardly beyond the bell crank lever 722. The arm 734 is provided with a longitudinal slot 736 in which is mounted a cross pin 738 carried by the bifurcated upper end portion of the bell crank lever 722. During the swinging movement of the head 418 in a clockwise direction, as seen in Fig. 18, the arm 734 is moved forwardly idly relatively to the bell crank lever 722, the bell crank lever 710 being held against counterclockwise movement relatively to the head 418 by the engagement of the head of the abutment screw 714 carried by the bell crank lever with a plate 716 (Fig. 19) which is part of a mechanism hereinafter described. The idle movement of the arm 734 brings it into a position in which the cross pin 738 is mounted in the rear portion of the slot 736, said rear portion having been widened to provide a shoulder 742 against which the cross pin 738 operates during clockwise movement of the bell crank lever 722. Thus the clockwise movement of the bell crank lever 722 causes a like clockwise movement of the bell crank lever 710. After an initial lost motion the clockwise movement of the bell crank lever 710 brings the abutment screw 714 to bear against the plate 716 and moves the slide 428 downwardly against the pressure of a spring 744 (Fig. 19) mounted in a socket 746 in the head 418 and arranged to bear against a rearward extension of the plate 716. The action of the screw 714 against the plate 716 causes the slide 428 to move downwardly with a rearward component into its position shown in Fig. 19 in order to cause the toe form 392 to expand and shape the toe portion of a prewelt upper in the machine.

During the first part of the operative movement of the bell crank lever 710 the screw 714 is advanced into position to engage the plate 716 and concomitantly mechanism now to be described is actuated by the operation of the bell crank lever to apply an initial downward pressure to the welt pressers 566 at opposite sides of the upper and during the subsequent actuation of the toe form 392 by the bell crank lever the pressure against the welt presser is increased so that the clamping action imparted by the welt pressers to the welted margin of the upper is in proportion to the expanding force applied by the form 392 to the inner surface of the toe portion of the upper. Referring to Figs. 3 and 18, the means for applying pressure to the welt pressers comprises rolls 748 constructed and arranged to engage the upper plane surface of the cam plates 698 mounted on the welt pressers. Each roll 748 is positioned in an open-ended slot formed in ears 750 projecting outwardly from a slide 752 mounted in a guideway in the head 418. Each roll rotates on a cross pin carried by the ears 750, said cross pin being located approximately at right angles to the path of movement of the cam plate 698 during the closing movement of the welt pressers so that the roll rotates freely during such closing movement of the welt pressers and offers no appreciable resistance thereto. As shown in Fig. 3, the slides 752 are located at opposite sides of the head 418. At their upper ends the slides are connected to the plate 716 by a bolt 754 (Fig. 19) and at their lower ends the slides are connected together by a pin 756 extending through a slot 758 formed in the head 418 and arranged parallel to the tongue 430. The pin 756 carries a roll 760 which is acted on by a spring 762 mounted in a bore 764 which communicates with the slot 758 and is arranged in parallel relation to the tongue 430. When the machine is at rest the rolls 760 are held in their elevated or retracted position shown in Fig. 18 by two springs 766 anchored at their upper ends to the bell crank lever 710 and at their lower ends to the arm 470 of the head 418. In the illustrated organization the retracted position of the rolls 748 is determined by the engagement of the roll 760 with the upper end wall of the slot 758. The upper portion of the spring 762 is seated in a socket 768 formed in a block 770 slidably mounted on tongues 772 formed in and extending inwardly from the slides 752. The block 770 carries a cross pin 774 the opposite end portions of which extend outwardly through longitudinal slots 776 formed in the slides. The block 770 is connected to the forwardly extending arm of the bell crank lever 710 by two short links 778 pivotally mounted at their upper ends on the opposite end portions of the cross pin 774 and at their lower ends on headed screws 780 (Fig. 18) carried by the forwardly extending portion of the bell crank lever 710 which is bifurcated to straddle the two slides.

In the operation of the toe station of the illustrated machine a treadle 942 (Figs. 1 and 5) is depressed to cause the application of fluid pressure to the piston 446 which operates through connections hereinbefore described to swing the head 418 in a clockwise direction, as seen in Fig. 18, thereby to advance the toe form 392 from its rest position, shown in Fig. 18, to its position within a prewelt upper supported in inverted position by its welted margin on the outer forms 396. The operation of the piston 446 also actuates the gripper member 442 to cause it to grip the welted margin at the toe end of the upper against the shoulder 438 (Fig. 20) in the forward portion of the welt presser 440. After the gripper member 442 engages the welted margin further operation of the piston 446 causes the gripper member and the welt pressers to move downwardly as a unit thus to locate the prewelt upper heightwise thereof relatively to the operating instrumentalities of the machine. If, after advancing the toe form 392 into the supported upper, the operator should find it desirable to relocate the upper on the outer forms 396 or to remove the upper from the machine without operating thereon, the retraction of the inner toe form may be effected by swinging the hand lever 784 forwardly to disengage the latch member 478 from the cross pin 472 thus permitting a sping 786 to swing the head 418 in a counterclockwise direction, as seen in Fig. 18, to return the toe form to its retracted position. The spring 786 is anchored at its forward end to the plate 740 and at its rear end to the upward extension 474 of the machine frame. In releasing the latch member 478 the hand lever 784 acts through a link 788 (Fig. 21) which is pivoted at its rear end on the hand lever and at its forward end on the upwardly extending arm of a bent lever 790 pivotally mounted between the upwardly extending portions of the latch member 478 on a cross pin 792 and having its forwardly extending portion 794 arranged to act against the upper surface of the block 466. Thus the operation of the hand lever 784 causes the bent lever 790 to swing in a clockwise direction, as seen in Fig. 21, thereby to swing the latch member 478 in a clockwise direction to disengage it from the cross pin 472. The treadle 942 is held depressed during the operation of the hand lever to prevent the operation of the piston 490. After the hand lever 784 is operated the treadle 942 is permitted to return to its elevated position thus causing the piston 446 to return the toe form 392 to its rest position and causing the operation of the piston 490 and the idle operation of the instrumentalities actuated by said piston. If, after the operation of the piston 446, the cycle of operations of the toe station is to be completed, the operator merely releases the pressure of his foot on the treadle 782 thus causing mechanism hereinafter described to open a pressure line to the piston 490. The upward movement of the treadle also closes the pressure line communicating with the piston 446 and opens an exhaust line thus permitting the return of the piston 446 to its rest position shown in Fig. 18 at a later stage in the cycle of operations. During the first part of the operation of the piston 490 the outer forms 396, the welt pressures 440 and 566 and the gripper member 442 are advanced as a unit by the action of the roll 526 on the block 528 to cause the upper to be gripped between the outer forms and the plate 394. After the advancement of the outer forms 396 is arrested by the plate 394 the gripper member 442 is disengaged from the welted margin of the upper and the welt pressers begin to move forwardly and inwardly as the roll 526 causes the block 528 to advance relatively to the slide 404. During the advancement of the welt pressers 566 a relatively light downward pressure is applied to the welt pressers to the welted margin of the upper by the action of the cam plates 698 at the forward ends of the welt pressers on the rolls 748 (Fig. 19) which act on beveled inner margins of the plates 698 (Figs. 23 and 24). At this point in the machine cycle the bell crank lever 710 (Fig. 19) is actuated to apply pressure to the spring 762 in order to increase the downward pressure of the rolls 748 against the plates 698 while the screw 714 advances idly from its position in Fig. 18 into engagement with the plate 716 at the upper end of the slide 428. Further operation of the bell crank lever 710 causes the operation of the slide 428 to advance the inner toe form 392 into its position shown in Fig. 19 in order to expand and shape the toe portion of the upper. During the operation of the slide 428 the bell crank lever 710 increases the pressure on the spring 762 to cause the clamping pressure of the welt pressers 566 against the welted margin of the upper to increase as the toe form 392 moves downwardly and rearwardly to expand the toe portion of the upper. Upon the completion of the movement of the bell crank lever 710 in a clockwise direction, as seen in Fig. 19, the cycle of operations in the toe station terminates.

The retraction of the operating instrumentalities in the toe station after the completion of the cycle of operations above described is effected either manually by the operation of the hand lever 784 or automatically by mechanism operated by the advancement of a member in the heel station, acting through mechanism hereinafter described. In either case forward movement is imparted to the link 788 and movement in a clockwise direction as seen in Fig. 18 is imparted to the hand lever 784. The hand lever has a short arm 796 extending rearwardly from its fulcrum point and having pivotally mounted at its rear end a pendant 798 which carries at its lower end a roll 800 which rides on the rear surface of the arm 456. During the first part of the advancement of the hand lever 784 the roll 800 engages the bottom surface of the arm 626 thus moving the shoulder 630 in said arm upwardly out of engagement with the pin 632. Thereupon the springs 634 and 636 advance the plunger 622 into its position relatively to the sleeve 614, shown in Fig. 18, and a spring 808 anchored to the sleeve 614 urges the bell crank lever 600 in a counterclockwise direction, as seen in Fig. 18. At a later stage in the retraction of the operating instrumentalities the tension of the spring 808 becomes effective to actuate the bell crank lever thereby to elevate the welt pressers into their rest position as the rolls 748 are retracted or moved upwardly into their position shown in Fig. 18. During the counterclockwise movement of the bell crank lever 600 by the spring 808 its downwardly extending arm fulcrums on the rear end of the pin 608 to move the slide 404 rearwardly into its rest position shown in Fig. 18. Such rearward movement of the slide returns the bent lever 524 to its rest position, the link 514 having previously been retracted by a spring 810 anchored thereto when the cylinder 492 was closed to pressure and opened to exhaust. Further movement of the hand lever 784 after releasing the arm 626 brings an extension 802 of the arm 796 into engagement with the lower end of a screw 804 mounted in an angle piece 806 on the rear end of the arm 734. Thus the operation of the hand lever elevates the arm 734 disengaging the shoulder 742 from the cross pin 738 and permitting the retraction of the bell crank lever 710 by the springs 766. Such retraction of the bell crank lever permits the spring 744 to return the inner toe form 392 to its elevated position in contact with the plate 394 and also elevates the slides 752 to return the rolls 748 to their elevated rest position relatively to the head 418, as shown in Fig. 18. Concomitantly with the elevation of the rolls 748 the springs 634 and 636 swing the bell crank lever 600 in a counterclockwise direction, as seen in Fig. 18, to return the welt pressers to their elevated rest position shown in Fig. 18. Still further movement of the hand lever 784 in a clockwise direction disengages the latch member 478 from the cross pin 472 thus permitting the springs 786 to swing the head 418 in a counterclockwise direction, as seen in Fig. 18, into its rest position shown in said figure.

When the two stations of the machine are operated alternately the hand lever 784, shown in Fig. 18, is not operated manually to release the operating instrumentalities for retraction to their respective rest positions but is automatically operated by the actuation of a lever 812 (Fig. 2) fulcrumed midway between its ends on a headed screw 814 fixed in the machine frame. The lever 812 is swung in a counterclockwise direction, as seen in Fig. 2, by the operation of the lever 318 (Fig. 7) in the heel station, said lever having an ear 816 projecting to the right, as seen in Fig. 2, and arranged to engage the forward end of a screw 818 mounted in the left end portion of the lever 812. At its right end the lever 812 has pivotally mounted thereon a latch member 820 (Fig. 18). During the movement of the lever 812 in a clockwise direction, as seen in Fig. 2, the latch member engages an ear 822 (Fig. 21) extending downwardly from the link 788 and moves the link to the right, as seen in Fig. 18. After the lever 812 has advanced the link 788 far enough to disengage the latch member 478 from the cross pin 472 a screw 824 (Fig. 2) carried by the latch member 820 engages an abutment member 826 mounted in and projecting rearwardly from the upward extension 474 of the machine frame. Further advancement of the lever 812 after the screw 824 engages the abutment member causes the latch member 820 to be swung in a clockwise direction, as seen in Fig. 2, thus disengaging it from the ear 822 and permitting the return of the link 788 to its rest position. During the return movement of the lever 318 (Fig. 7) to its rest position a spring 828 swings the lever 812 in a counterclockwise direction, as seen in Fig. 2, and thus returns the latch member 820 to its position behind the ear 822. The spring 828 has its left end anchored to the frame of the heel station and its right end anchored to a pin 830 projecting rearwardly from the right end portion of the lever 812.

When the two stations of the machine are operated alternately the hand lever 386 (Fig. 7) in the heel station is automatically operated to release the operating instrumentalities in that station by the bell crank lever 722 of the toe station operating through a lever 832 fulcrumed substantially midway between its ends on a headed screw 834 mounted in a fixed arm 836 (Fig. 1) extending upwardly and outwardly from the frame of the heel station. As shown in Fig. 1 the lever 832 comprises an upper arm 838 projecting from a hub 840 and having its free end portion arranged adjacent to the bell crank lever 722 in the toe station and a lower arm 842 extending to the left from the hub 840 (Fig. 7) and having its free end arranged forward of and adjacent to an ear 844 projecting upwardly from the link 92. As shown in Fig. 2, the free end of the arm 838 carries a screw 846 which is engaged by an offset portion 848 in the bell crank lever 722. The arm 842 carries at its free end a latch member 850 (Fig. 7) constructed and arranged to engage the vertical forward edge face of the ear 844 thereby to move the link 92 rearwardly during movement of the lever 832 in a clockwise direction, as seen in Fig. 2. After the link 92 has operated to release the operating instrumentalities in the heel station a screw 852 (Fig. 7) mounted in a depending lug 854 projecting from an offset portion of the latch member 850 engages a fixed arm 856 projecting horizontally to the left from the arm 836 thereby swinging the latch member in a clockwise direction, as seen in Fig. 2, to disengage it from the ear 844 thus permitting the forward movement of the link 92 to its normal rest position.

The pressure fluid actuation of the pistons 68 and 130 in the heel station is controlled by the treadle 364 through mechanism illustrated in Fig. 4. The treadle is fixed to a rockshaft 858 to which is also fixed an arm 860 which extends upwardly from the rockshaft and is connected by a link 862 to the upper end of an arm 864 fixed to a rockshaft 866 mounted in bearings in standards 868 at the top of a housing 870 mounted on the base 32. Also fixed to the rockshaft 866 is a forwardly extending arm 872 which is connected by a link 874 to the forwardly extending arm of a bell crank lever 876 fixed to a rockshaft 878 journaled in a valve housing 880. Fixed on the rockshaft 878 within the valve housing is a rotary valve body 882. In the normal position of the valve body, as shown in Fig. 4, the bell crank lever 876 is held at the limit of its counterclockwise movement by a spring 884 one end of which is anchored to the upwardly extending arm of the bell crank lever and the other end to the cylinder 70. A stop screw 886 mounted in an ear 888 projecting from the valve housing adjustably determines the rest position of the bell crank lever and so positions the valve body that the port 890 at the lower end of the cylinder 70 communicates with an exhaust line 892. The depression of the treadle 364 causes the valve body 882 to rotate into a position determined by the engagement of the forwardly extending arm of the bell crank lever 876 with a stop screw 894 adjustably mounted in an ear 896 projecting from the valve housing 880. When the bell crank lever is in contact with the stop screw 894 the exhaust line is closed and the port 890 is in communication with a pressure line 898. The operation of the piston 68 advances the inner heel form 34 into its position shown in Fig. 9 and the detent 78 holds the heel form against return movement. After inspecting the work and determining that it is correctly located with relation to the operating instrumentalities of the heel station the operator releases the pressure of his foot on the treadle 364 (Fig. 4) and the spring 884 returns the bell crank lever 876 to its position shown in Fig. 4 thus bringing the cylinder 70 into communication with the exhaust line 892. The spring 884 also operates through the link 874 and connections hereinbefore described rotate the shaft 858 in a counterclockwise direction, as seen in Fig. 4. Fixed to the shaft and extending upwardly therefrom is an arm 900 which has pivotally mounted at its upper end a rearwardly extending pawl 902 the free end portion of which is held in engagement with a ratchet wheel 904 by a spring 906 one end of which is anchored to the detent and the other end to the arm 900. The ratchet wheel 904 is fixed to a cross shaft 908 which rotates in standards 910 projecting upwardly and forwardly from the housing 870. Also fixed to the cross shaft 908 is a rotary cam 912 constructed and arranged to act on a roll 914 pivotally mounted in the end portion of a stem 916 slidably mounted in a forward extension 918 of the micro-switch 376. The cam 912 has six rises uniformly spaced about its periphery. The counterclockwise rotation of the shaft 858 following the operation of the piston 68 causes one of the rises in the cam to engage the roll 914 and to move it rearwardly or to the left, as seen in Fig. 4, thus closing the micro-switch 376. The operation of the micro-switch closes an electrical circuit to the solenoid 378. The solenoid is connected by a link 920 to an arm 922 fixed to an extension of a shaft 924 on which is mounted the valve body 380. The solenoid is mounted in a bracket 926 fixed to the upper surface of a cross head 928 which has fixed to its lower surface a bracket 930 to which is fixed a housing 932 in which is mounted the valve body 380. The operation of the solenoid moves the link 920 upwardly and rotates the valve body 380 90° in a counterclockwise direction as seen in Fig. 4 thus connecting a pressure line 934 to a service line 936. The service line 936 communicates with a shut-off valve 938 and through the shut-off valve with a service line 940 communicating with the head 188 (Fig. 7) at the rear end of the cylinder 132. The pressure in the cylinder 132 is maintained until a treadle 942 (Fig. 5) in the toe station is depressed to effect the operation of the piston 446 (Fig. 18) through mechanism hereinafter described. The upward movement of the treadle 942 following the operation of the piston 446 causes a detent 944 (Fig. 5) corresponding to the detent 902 to act on a ratchet wheel 946 corresponding to the ratchet wheel 904, said ratchet wheel being fixed to the cross shaft 908 which mounts the ratchet wheel 904. The operation of the detent 944 is identical to the operation of the detent 902. In each case the detent rotates the ratchet wheel in a counterclockwise direction, as seen in Fig. 4, to bring the next tooth on the ratchet wheel into detent engaging position. Inasmuch as there are twice as many teeth on the ratchet wheel as there are rises in the rotary cam 912 the operation of the rotary cam by the upward movement of the treadle 942 causes the roll 914 to register with the low point of a rise in the rotary cam. Thereupon a spring incorporated in the micro-switch 376 (Fig. 4) moves the stem 916 forwardly opening the micro-switch to break the electrical circuit to the solenoid 378 and thus permitting the spring 382 connected at its upper end to the arm 922 and at its lower end to the bracket 930 to swing the arm 922 downwardly or in a clockwise direction as seen in Fig. 4 and thus rotating the valve body 380 90° in a clockwise direction. In this position of the valve body the pressure line 934 is in communication with a service line 950 connected to the shut-off valve 938 and communicating through the shut-off valve with a service line 952 connected to the head 494 (Fig. 18) at the right end of the cylinder 492. When it is desired to operate the heel station only the shut-off valve is operated by mechanism hereinafter described to close the service line 952 and, conversely, when it is desired to operate the toe station only the shut-off valve 938 is operated to close the service line 940.

For controlling the flow of pressure fluid to the piston 446 a valve 954 (Fig. 4) is mounted on an extension of the cylinder 448 and is operated by connections from the treadle 942 (Fig. 5). The valve comprises a rotary valve body 956 mounted on a rock shaft 958 journaled in a valve housing 960. Fixed to a portion of the shaft 958 extending beyond the valve housing is a bell crank lever 962. When the machine is at rest the bell crank lever is held against an abutment screw 964 by a spring 966 and the valve body 956 is so arranged that a port 968 in the cylinder 448 is in communication with an exhaust line 970. In order to bring the port 968 into communication with a pressure line 972 the valve body 956 is rotated by a clockwise movement of the bell crank lever 962 effected by the depression of the treadle 942 through connections comprising a link 974 connecting the forwardly extending arm of the bell crank lever 962 to an arm 976 fixed to and extending forwardly from a rock shaft 978 mounted in standards 980 extending upwardly from the housing 870. Fixed to and projecting upwardly from the rock shaft 978 is an arm 982 which is connected by a link 984 (Fig. 5) to the upper end of an arm 986 fixed to a rock shaft 988 to which is also fixed the treadle 942. The treadle 942 is normally held in its elevated position by a spring 990 anchored at its forward end to the arm 986 and at its rear end to an extension of the shaft 978, the elevated rest position of the treadle being determined by the engagement of a screw 992 mounted in the arm 986 with a fixed bracket 994.

The shut-off valve 938, hereinbefore referred to, is illustrated in Figs. 26 and 27 and comprises two valve bodies or spools 996 and 998 slidably mounted in a housing 1000 mounted on a horizontal plate 1002 (Fig. 4) secured to the top of the machine frame by three headed screws 1004 extending through three sleeves 1006. Referring to Fig. 27, the two spools are normally held at the limit of their movement away from each other by a spring 1007 mounted in sockets in the two spools, respectively. In this position the spool 996 is so arranged that a port 1008 which communicates with a service line 936 is also in communication with a port 1010 which communicates with the service line 940 and pressure fluid flows freely through the valve and through the service line 940 to the cylinder 132. Similarly the spool 998 in its normal rest position is so arranged that pressure fluid flows freely through the valve from a port 1012 communicating with the service line 950 to a port 1014 communicating with the service line 952. The spool 996 is moved to the right to close the port 1010 by movement of a hand lever 1016 (Fig. 25) in a counterclockwise direction, as seen in said figure, and the spool 998 is moved to the left to close the port 1014 by movement of the hand lever in a clockwise direction. The hand lever is fulcrumed on a headed screw 1018 mounted in the top of the machine frame and extending through a hub 1020 (Fig. 4) formed in the lever. The lever has a downturned rear end portion 1022 constructed and arranged to extend through an opening 1024 in the top 1076 of the machine frame and through a space between two links 1026 and 1028 (Fig. 26). The link 1026 is arranged adjacent to the rear surface of the downturned end portion 1022 and the link 1028 is arranged adjacent to the front surface of said extension. The link 1026 is pivotally connected to the upper end portion of a lever 1030 fulcrumed on an ear 1032 projecting outwardly from an upward extension 1034 of the housing 1000. Similarly the link 1028 is pivotally connected to the upper end portion of a lever 1036 which is fulcrumed on an ear 1038 projecting outwardly from an upward extension 1040 of the housing 1000. The central portion of the link 1026 is drilled to receive a bolt 1042 which extends forwardly through a longitudinal slot 1044 in the link 1028 and carries a roll 1046 mounted in the space between the two links. Similarly the central portion of the link 1028 is bored to receive a bolt 1048 which extends rearwardly from the link 1028 through a longitudinal slot 1050 in the inner end portion of the link 1026. The bolt 1048 carries a roll 1052 positioned in the space between the two links. The lower end portion of the lever 1030 acts against the end of a stem 1054 projecting outwardly from the spool 996 through a bore in the end wall 1056 of the housing 1000 and the lever 1036 bears against the end of a stem 1058 projecting outwardly from the spool 998 through a bore in an end wall 1060 at the right side of the housing. In the operation of the hand lever 1016 to close the port 1010 the downturned end portion 1022 of the hand lever moves to the left as seen in Fig. 26 and acts against the roll 1046 to move the link 1026 to the left thus imparting counterclockwise movement to the lever 1030 and moving the spool 996 to the right to close the port. In closing the port 1014 the downturned end portion of the hand lever moves to the right and acts against the roll 1052 moving the link 1028 to the right and swinging the lever 1036 in a clockwise direction, as seen in Fig. 26, against the stem 1058 of the spool 998. In order to obviate occurrence of a fluid lock between the two spools 996 and 998 a suitable drain line 1062 is connected to a port 1064 in the housing 1000, said port communicating with the space between the spools. The hand lever 1016 is normally held in its central position shown in Fig. 25 by the spring 1006 between the spools. In order to permit the hand lever to be held at the limit of its movement in either direction from its central position a latch plate 1066 is secured to the top of the machine frame and a handle 1068 is fulcrumed in the bifurcated upturned forward end portion 1070 (Fig. 4) of the hand lever, said handle having a downward extension 1072 which serves as a latch member for the hand lever. Referring to Fig. 25 the extension 1072 acts against one of two shoulders 1074 in the latch plate 1066 to hold the hand lever against return movement to its central position.

Having thus described my invention, what I claim as new and desire to secure by Letters Patent of the United States is:

1. In a machine for shaping prewelt uppers, the combination with means for supporting a prewelt upper by engagement with the upper attaching face of the welt, of an inner form for shaping the upper, a carrier for the inner form, means for actuating the carrier to advance the inner form into the supported upper, a stop for terminating the advancement of the inner form, and a detent constructed and arranged to engage the carrier and to hold it positively against movement away from the stop.

2. In a machine for shaping prewelt uppers, the combination with means for supporting a prewelt upper by engagement with the upper attaching face of the welt, of an inner form for shaping the upper, a detent for holding the form against retracting movement, a member constructed and arranged to release the detent, manually operated means for operating said mmeber, and automatic means for operating said member.

3. In a machine for shaping prewelt uppers, the combination with means for supporting a prewelt upper by engagement with the upper attaching face of the welt, of an inner form for shaping the upper, a carrier for the inner form, means for actuating the carrier to advance the inner form into the supported upper, a stop for terminating the advancement of the carrier, a detent constructed and arranged to engage the carrier and to hold it positively against movement away from the stop, a member for releasing said detent, manually operated means for operating said member, and automatic means for operating said member.

4. In a machine for shaping prewelt uppers, the combination of means constructed and arranged to engage the outer margin of the upper-attaching face of the welt of a prewelt upper in the machine, means constructed and arranged to engage the inner margin of the outsole attaching face of the welt, and means for actuating both of said welt engaging means to bend the welt into a position in which it is inclined downwardly toward the interior of the upper.

5. In a machine for shaping prewelt uppers, the combination with an inner form for shaping a supported prewelt upper, of a member constructed and arranged to engage the outer margin of the upper-attaching face of the welt, a presser constructed and arranged to engage the inner margin of the outsole attaching face of the welt, and means for moving the member and the presser in opposite directions heightwise of the upper to bend the welted margin over the inner form.

6. In a machine for shaping prewelt uppers, the combination of means constructed and arranged to engage the outer margin of the upper-attaching face of the welt of a prewelt upper in the machine, means constructed and arranged to engage the inner margin of the outsole-attaching face of the welt, and means for actuating both of said welt engaging means to bend the welted margin of the upper into a position in which it is inclined downwardly toward the interior of the upper to a degree commensurate with the normal spring-back of the welted margin.

7. In a machine for shaping prewelt uppers, the combination with an inner form for shaping a supported prewelt upper, of a member constructed and arranged to engage the outer margin of the upper attaching face of the welt, a presser constructed and arranged to engage the inner margin of the outsole attaching face of the welt, and means for moving the member and the presser in opposite directions heightwise of the upper to bend the welt over the inner form into a position in which it is inclined downwardly toward the interior of the supported upper.

8. In a machine for shaping prewelt uppers, the combination with an inner form for shaping a supported upper, of a member constructed and arranged to engage the upper attaching face of the welt of a supported upper, a plurality of pressers constructed and arranged to engage the outsole attaching face of the welt, and means for actuating the member and the pressers to shape the welted margin of the upper over the inner form.

9. In a machine for shaping prewelt uppers, the combination with an inner upper shaping form, of a member constructed and arranged to engage the upper attaching face of the welt, a central presser constructed and arranged to engage the outsole attaching face of the welt, two side pressers constructed and arranged to engage the outsole attaching face of the welt, and means for concomitantly actuating the member and the three pressers to shape the welted margin of the upper over the inner form.

10. In a machine for shaping prewelt uppers, an inner form having a sole face characterized by a beveled margin forming the periphery of a recess, a member constructed and arranged to engage the upper attaching face of the welt, means constructed and arranged to engage the outsole attaching face of the welt, and means for actuating said member and said means to bend the welted margin inwardly over the beveled periphery of the inner form into a position in which the welt is inclined downwardly toward the recess in the form.

11. In a machine for shaping prewelt uppers, the combination with an outer form constructed and arranged to support a prewelt upper by engagement with the upper attaching face of the welt, of a welt lifter constructed and arranged to engage the upper attaching face of the welt, a parallel motion mechanism for mounting the lifter, and means for actuating the parallel motion mechanism to advance the lifter.

12. In a machine for shaping prewelt uppers, the combination with an outer form constructed and arranged to support a prewelt upper by engagement with the upper attaching face of the welt, of a welt lifter constructed and arranged to engage the upper attaching face of the welt, a parallel motion mechanism for mounting the lifter, and means for actuating the parallel motion mechanism to advance the lifter, said parallel motion mechanism being characterized by means which yields, upon engagement of the lifter with the outer form, to permit rectilinear movement of the lifter upon the form.

13. In a machine for shaping prewelt uppers, the combination with an outer form constructed and arranged to support a prewelt upper by engagement with the upper attaching face of the welt, of a welt lifter constructed and arranged to engage the upper attaching face of the welt, a parallel motion mechanism for mounting the lifter, and means for actuating the parallel motion mechanism to advance the lifter, said parallel motion mechanism being characterized by an extensible link which yields to permit a measured rectilinear movement of the lifter upon the upper surface of the outer form.

14. In a machine for shaping prewelt uppers, the combination with an outer form constructed and arranged to support a prewelt upper by engagement with the upper attaching face of the welt, of a welt lifter constructed and arranged to engage the upper attaching face of the welt, a parallel motion mechanism for mounting the lifter, means for actuating the parallel motion mechanism to advance the lifter, said parallel motion mechanism being characterized by an extensible link having incorporated therein resilient means for holding it extended, and adjustable means for varying the length of the link thereby to determine the measurement of a rectilinear movement of the lifter upon the outer form.

15. In a machine for shaping prewelt uppers, the combination with an outer form constructed and arranged to support a prewelt upper by engagement with the upper attaching face of the welt, of a welt lifter constructed and arranged to engage the upper attaching face of the welt, a parallel motion mechanism for mounting the lifter, and means for actuating the parallel motion mechanism to advance the lifter, said parallel motion mechanism being constructed and arranged to cause the lifter to advance with an upward component of movement during the latter part of its operation thereby to move the outwardly extending margin of the welt upwardly away from the welt supporting surface of the outer form.

16. In a machine for shaping prewelt uppers, the combination with an outer form for shaping prewelt uppers supported in the machine, of an end-embracing member constructed and arranged to engage the upper attaching face of the welt, said member being characterized by a generally wedge-shaped structure whereby the member engages the upper attaching face of the welt and lifts it from the surface of the outer form.

17. In a machine for shaping prewelt uppers, an outer form constructed and arranged to support a prewelt upper by engagement with the upper attaching surface of the welt, a slide on which the form is mounted for movement lengthwise of an upper in the machine, an end-embracing welt lifter constructed and arranged to engage the upper attaching face of the welt, and means for concomitantly advancing the outer form and the welt lifter.

18. In a machine for shaping prewelt uppers, an outer form constructed and arranged to support a prewelt upper by engagement with the upper attaching face of the welt, a slide on which the form is mounted for movement lengthwise of an upper supported thereon, a welt lifter constructed and arranged to engage the upper attaching face of the welt and to move it upwardly away from the form, a parallel motion mechanism on which the welt lifter is mounted, and a common actuator for advancing the slide and for operating the parallel motion mechanism to advance the welt lifter.

19. In a machine for shaping prewelt uppers, an outer form constructed and arranged to support a prewelt upper by engagement with the upper attaching face of the welt, a slide on which the form is mounted, a welt lifter constructed and arranged to engage the upper attaching face of the welt and to lift the welt away from the outer form, a crosshead, operating connections from the crosshead to the slide, operating connections from the crosshead to the welt lifter, and power operated means for advancing the crosshead.

20. In a machine for shaping prewelt uppers, an outer form constructed and arranged to support a prewelt upper by engagement with the upper attaching face of the welt, a slide on which the form is mounted, a welt lifter constructed and arranged to engage the upper attaching face of the welt and to lift the welt away from the outer form, a crosshead, operating connections from the crosshead to the slide, operating connections from the crosshead to the welt lifter, a piston, connections from the piston to the crosshead, and means for advancing the piston.

21. In a machine for shaping prewelt uppers, a pair of outer forms, a pair of levers for closing the forms on a prewelt upper in the machine, two rolls carried by the levers respectively, and two springs mounted on the outer forms respectively and arranged to be engaged by the rolls during the operation of the levers.

22. In a machine for shaping prewelt uppers, a pair of outer forms for shaping a prewelt upper in the machine, a slide on which the forms are pivotally mounted, a pair of levers carried by the slide and arranged to close the forms on the upper, springs interposed between the levers and the forms respectively, an actuator, positive operating connections between the actuator and the slide, and operating connections between the actuator and the levers.

23. In a machine for shaping prewelt uppers, a pair of outer forms for shaping a prewelt upper in the machine, a slide on which the forms are pivotally mounted, a pair of levers carried by the slide and arranged to close the forms on the upper, springs interposed between the levers and the forms respectively, an actuator, positive operating connections between the actuator and the slide, operating connections between the actuator and the lever, and connections between the levers and the outer forms whereby the forms are opened by retracting movement of the levers.

24. In a machine for shaping prewelt uppers, a pair of outer forms, a slide on which the outer forms are pivotally mounted, an actuator, toggle means whereby the actuator applies yielding pressure to the forms to close them on an upper in the machine, and means whereby the actuator positively advances the slide to advance the outer forms bodily.

25. In a machine for shaping prewelt uppers, the combination with an inner form for shaping a prewelt upper, of a pair of outer forms, a slide on which the outer forms are pivotally mounted, an actuator, toggle mechanism whereby the actuator yieldingly closes the outer forms to shape the upper against the inner form, and means whereby the actuator positively advances the slide to impart a movement of translation to the outer forms after they have exerted an initial pressure upon the upper.

26. In a machine for shaping prewelt uppers, the combination with an inner form, of a pair of outer forms, a slide on which the outer forms are pivotally mounted, an actuator, fluid pressure operated means for advancing the actuator, means whereby the actuator imparts yielding pressure to the outer forms to close them against an upper embracing the inner form, and means whereby the actuator positively advances the slide thereby to impart a movement of translation to the outer forms, the movement of translation being arrested by the engagement of the outer forms with the back line portion of the upper and the fluid pressure being maintained thereafter to cause the outer forms to shape the upper against the inner form.

27. In a machine for shaping prewelt uppers, the combination with an inner form, of a pair of outer forms, wipers for wiping the welted margin inwardly over the inner form, an actuator, means whereby the actuator imparts a yielding closing action to the outer forms, means whereby the actuator positively imparts a movement of translation to the outer forms, and means whereby the actuator advances the wipers.

28. In a machine for shaping prewelt uppers, an inner form, a carrier for the inner form mounted for angular movement to advance the inner form into its operative position, wipers mounted on the carrier and constructed and arranged to wipe the welted margin of a prewelt upper inwardly over the inner form, a pair of outer forms, a slide on which the outer forms are pivotally mounted, an actuator, means whereby the actuator yieldingly closes the outer form on the inner form, means whereby the actuator positively imparts a movement of translation to the outer forms, and means whereby the actuator advances the wipers.

29. In a machine for shaping prewelt uppers, an inner form, a carrier for the inner form mounted for angular movement to advance the inner form into its operating position, wipers mounted on the carrier and constructed and arranged to wipe the welted margin of a prewelt upper inwardly over the inner form, a pair of outer forms, a slide on which the outer forms are pivotally mounted, an actuator, means whereby the actuator yieldingly closes the outer forms on the inner form, means whereby the actuator positively imparts a movement of translation to the outer forms, means whereby the actuator advances the wipers, and fluid pressure operated means for operating the actuator and for causing the actuator to maintain a continuing pressure against the outer forms after their advancement has been completed.

30. In a machine for shaping prewelt uppers, the combination with an inner form, of a plurality of welt pressers constructed and arranged to engage the welted margin of a prewelt upper embracing the inner form, and a carrier on which the welt pressers are mounted for self-leveling movement relatively to the welted margin.

31. In a machine for shaping prewelt uppers, an inner form, a first carrier for the inner form movable to advance the form to and from operating position, a plurality of welt pressers constructed and arranged to engage the welted margin of a prewelt upper embracing the inner form, a second carrier for the welt pressers mounted on the first carrier, and means so mounting the welt pressers on the second carrier that they are movable relatively to the second carrier to level themselves relatively to the welted margin of the upper.

32. In a machine for shaping prewelt uppers, an inner form, a welt presser, and a carrier on which the inner form and the presser are both mounted, said carrier being movable to advance the inner form and the presser into their respective operating positions.

33. In a machine for shaping prewelt uppers, an inner form, a welt presser, a lever on which the inner form and the welt presser are both mounted, and means for actuating the lever to advance the inner form and the welt presser into their respective operating positions.

34. In a machine for shaping prewelt uppers, an inner form, a welt presser, a lever on which the inner form and the welt presser are both mounted, means for actuating the lever to advance the inner form and the welt presser into their respective operating positions, and a detent for locking the lever against return movement.

35. In a machine for shaping prewelt uppers, an inner form, a welt presser, a lever on which the inner form and the welt presser are both mounted, means for actuating the lever to advance the inner form and the welt presser into their respective operating positions, a stop for limiting the advancement of the lever, and a detent for locking the lever against return movement.

36. In a machine for shaping prewelt uppers, a central welt presser, a carrier in which the welt presser is mounted for rectilinear movement, and a pair of welt pressers fulcrumed on the carrier for swinging movement into welt engaging position.

37. In a machine for shaping prewelt uppers, a plurality of welt pressers, a member on which the welt pressers are mounted, and a carrier for the member operable to advance the welt pressers into operating position.

38. In a machine for shaping prewelt uppers, a plurality of welt pressers, a member on which the welt pressers are mounted, a carrier for the member operable to advance the welt pressers into operating position, and means on the carrier for applying an initial pressure to the member when the pressers meet the resistance of the work.

39. In a machine for shaping prewelt uppers, a plurality of welt pressers, a member on which the welt pressers are mounted, a carrier for the member operable to advance the welt pressers into operating position, means on the carrier for applying an initial pressure to the member when the pressers meet the resistance of the work, and means for applying final pressure to the welt pressers.

40. In a machine for shaping prewelt uppers, a pair of wipers constructed and arranged to operate on the outsole attaching surface of the welt of a prewelt upper in the machine, a carrier for the wipers, means for operating the carrier to advance the wipers from a remote position into their wiping position, and means operating thereafter to advance the wipers.

41. In a machine for shaping prewelt uppers, a pair of wipers constructed and arranged to operate against the outsole attaching surface of the welt of a prewelt upper in the machine, a member on which the wipers are fulcrumed for wiping movement, a carrier for the member, and means for actuating the carrier to advance the wipers from a remote position into their wiping position.

42. In a machine for shaping prewelt uppers, a pair of wipers constructed and arranged to operate against the outsole attaching surface of the welt of a prewelt upper in the machine, a member on which the wipers are fulcrumed for wiping movement, a carrier for the member, means for actuating the carrier to advance the wipers from a remote position into their wiping position, and means mounted on the carrier and constructed and arranged to apply pressure to the member when the wipers meet resistance.

43. In a machine for shaping prewelt uppers, a pair of wipers constructed and arranged to operate against the outsole attaching surface of the welt of a prewelt upper in the machine, a member on which the wipers are fulcrumed for wiping movement, a carrier for the member, means for actuating the carrier to advance the wipers from a remote position into their wiping position, means mounted on the carrier and constructed and arranged to apply pressure to the member when the wipers meet the resistance of the work, and means whereby the member is mounted in the carrier to permit self-leveling movement of the wipers relatively to the welt.

44. In a machine for shaping prewelt uppers, a pair of wipers constructed and arranged to operate against the outsole attaching surface of the welt of a prewelt upper in the machine, a member on which the wipers are fulcrumed for wiping movement, a carrier for the member, means for actuating the carrier to advance the wipers from a remote position into their wiping position, means mounted on the carrier and constructed and arranged to apply pressure to the member when the wipers meet the resistance of the work, means operating after the carrier has come to the limit of its advancement to cause the wipers to overwipe the welted margin of the upper, and means operating against the member after the completion of the overwiping movement to move it in a direction to cause the wipers to apply molding pressure to the welted margin of the upper.

45. In a machine for shaping prewelt uppers, a central presser and a pair of side pressers constructed and arranged to engage the outsole attaching surface of the welt of a prewelt upper in the machine, a member on which the side pressers are mounted for movement to perform an overwiping operation on the welted margin of the upper, and a slide on which the central presser is mounted, said slide being mounted in the member for movement to cause the presser to perform an overwiping operation on the welted margin of the upper.

46. In a machine for shaping prewelt uppers, a central presser and a pair of side pressers constructed and arranged to engage the outsole attaching surface of the welt of a prewelt upper in the machine, a member on which the side pressers are mounted for movement to perform an overwiping operation on the welted margin of the upper, a slide on which the central presser is mounted, said slide being mounted in the member for movement to cause the presser to perform an overwiping operation on the welted margin of the upper, and a carrier in which the member is mounted for movement to advance the presser from a remote position into operating relation to the upper.

47. In a machine for shaping prewelt uppers, a central presser and a pair of side pressers constructed and arranged to engage the outsole attaching surface of the welt of a prewelt upper in the machine, a member on which the side pressers are mounted for movement to perform an overwiping operation on the welted margin of the upper, a slide on which the central presser is mounted, said slide being mounted in the member for movement to cause the presser to perform an overwiping operation on the welted margin of the upper, an actuator carried by said member, and means whereby the actuator advances the central presser and the side pressers.

48. In a machine for shaping prewelt uppers, a central wiper, a pair of side wipers, a member on which the side wipers are mounted for overwiping movement, a first slide fixed to the central wiper and mounted in said member, a second slide mounted in said member, means whereby the second slide advances the first slide to actuate the central wiper, and means whereby the second slide advances the side wipers.

49. In a machine for shaping prewelt uppers, a central wiper, a pair of side wipers, a member on which the side wipers are mounted for overwiping movement, a first slide fixed to the central wiper and mounted in said member, a second slide mounted in said member, means whereby the second slide advances the first slide to actuate the central wiper, means whereby the second slide advances the side wipers, and means for advancing the second slide.

50. In a machine for shaping prewelt uppers, a wiper for performing an overwiping operation on the welted margin of a prewelt upper in the machine, a slide on which the wiper is mounted, a member in which the slide is mounted, a carrier for the member, means for operating the carrier to advance the wiper from a remote position into an overwiping position, and means operated by the advancement of the carrier to impart an initial advancement to the slide.

51. In a machine for shaping prewelt uppers, a wiper for performing an overwiping operation on the welted margin of a prewelt upper in the machine, a slide on which the wiper is mounted, a member in which the slide is mounted, a carrier for the member, means for operating the carrier to advance the wiper from a remote position into operating relation to the upper, means operated by the advancement of the carrier to impart an initial advancement to the slide, and means operating after the completion of the advancement of the carrier to impart further advancement to the slide.

52. In a machine for shaping prewelt uppers, a wiper for performing an overwiping operation on a prewelt upper in the machine, a slide on which the wiper is mounted, a member in which the slide is mounted, a carrier for the member operable to advance the wiper from a remote position into operating relation to the upper, a lever fulcrumed on the member and arranged to engage the slide, and means actuated by the operation of the carrier for swinging the lever in a direction to advance the slide.

53. In a machine for shaping prewelt uppers, a wiper constructed and arranged to perform an overwiping operation on the welted margin of a prewelt upper in the machine, a member in which the wiper is mounted for overwiping movement, a carrier for the member operable to advance the wiper from a remote position into operating relation to the upper, and means mounting the member and the carrier so as to permit self-leveling movement of the wiper relatively to the welt margin of the upper, and yielding means for holding the margin in predetermined relation to the upper.

54. In a machine for shaping prewelt uppers, a wiper constructed and arranged to perform an overwiping operation on the welted margin of a prewelt upper in the machine, a member in which the wiper is mounted for overwiping movements, a carrier for the member operable to advance the wiper from a remote position into operating relation to the upper, and means mounting the member and the carrier so as to permit self-leveling movement of the wiper relatively to the welted margin of the upper, yielding means for holding the welted margin in predetermined relation to the wiper, means on the carrier for imparting an initial pressure to the member and through the member to the wiper as the wiper meets the resistance of the work during the advancement of the carrier, and means operating after the completion of the advancement of the carrier for imparting heavy pressure to the member.

55. In a machine for shaping prewelt uppers, a pair of outer forms constructed and arranged to operate on a prewelt upper in the machine, a wiper for performing an overwiping operation on the welted margin of the upper, a piston, and means whereby the piston advances the outer forms and imparts overwiping movement to the wiper.

56. In a machine for shaping prewelt uppers, a pair of outer forms for shaping a prewelt upper in the machine, a central wiper and a pair of side wipers for overwiping the welted margin of the upper, an actuator, means whereby the actuator advances the outer forms, and means whereby the actuator imparts overwiping movement to the three wipers.

57. In a machine for shaping prewelt uppers, a pair of outer forms for shaping a prewelt upper in the machine, a central wiper and a pair of side wipers for overwiping the welted margin of the upper, a member for mounting the wipers, an operating slide mounted in the member, means whereby the slide advances the wipers, an actuator, means whereby the actuator advances the outer forms into upper engaging position, and means whereby the actuator advances the slide.

58. In a machine for shaping prewelt uppers, a pair of outer forms for shaping a prewelt upper in the machine, a central wiper and a pair of side wipers for overwiping the welted margin of the upper, a member for mounting the wipers, an operating slide mounted in the member, means whereby the slide advances the wipers, an actuator, means whereby the actuator advances the outer forms into upper engaging position, and means whereby the actuator advances the slide after the outer forms have come into contact with the upper.

59. In a machine for shaping prewelt uppers, a wiper for performing an overwiping operation on the welted margin of a prewelt upper in the machine, a member in which the wiper is mounted for overwiping movement, an operating slide mounted in the member and arranged to actuate the wiper, an operating means constructed and arranged to act on the slide, a carrier for the member, and means for actuating the carrier to advance the wiper from a remote position into operating relation to the supported upper and for bringing the slide into registration with the operating means.

60. In a machine for shaping prewelt uppers, a wiper for overwiping the welted margin of a prewelt upper in the machine, a slide on which the wiper is mounted, a member in which the slide is mounted for rectilinear movement, a carrier for the member, means for actuating the carrier to advance the wiper into operating relation to the welted margin of the upper, power operated means for actuating the slide thereby to impart overwiping movement to the wiper, and yielding means for retracting the slide.

61. In a machine for shaping prewelt uppers, a welt lifter constructed and arranged to engage the upper attaching face of the welt of a prewelt upper in the machine, a welt presser constructed and arranged to engage the outsole attaching face of the welt, a carrier for the welt presser operable to advance the welt presser from a remote position into operating relation to the upper, means operated by the advancement of the carrier to advance the welt presser inwardly over the welt into the welt pressing position, means operating thereafter to move the welt lifter heightwise of the upper in a direction to lift the outer margin of the welt, and means operating concomitantly with the welt lifter to move the welt presser heightwise of the upper in a direction to apply pressure to the inner margin of the welt.

62. In a machine for shaping prewelt uppers, a central wiper and a pair of side wipers for overwiping the welted margin of a prewelt upper in the machine, a member on which the wipers are mounted, a carrier for the member operable to advance the wipers from a remote position into operating relation to the upper, means on the carrier for imparting welt shaping pressure to the wipers, and abutment means on the member constructed and arranged to engage the side wipers and to transmit thereto the pressure of said pressure applying means.

63. In a machine for shaping prewelt uppers, an inner heel form, a heel wiper constructed and arranged to engage the outsole attaching face of the welt of a prewelt upper in the machine and operable to wipe the heel end portion of the welted margin inwardly over the heel form, and a welt lifter constructed and arranged to engage the upper attaching face of the welt at the heel end portion of the upper and to cooperate with the wiper to shape the heel end portion of the welded margin over the inner form.

64. In a machine for shaping prewelt uppers, an inner upper shaping form, means constructed and arranged to engage the outer surface of the upper and to cooperate with the inner form to shape the upper, a welt presser constructed and arranged to engage the outsole attaching face of the welt, and a welt lifter constructed and arranged to engage the upper attaching face of the welt and to cooperate with the welt presser to shape the welted margin over the inner form.

65. In a machine for shaping prewelt uppers, an inner upper shaping form, a pair of outer forms constructed and arranged to shape a prewelt upper against the inner form, a central wiper and a pair of side wipers, all three wipers being constructed and arranged to engage the outsole attaching face of the welt and to wipe the welted margin inwardly over the inner form, and a welt lifter constructed and arranged to engage the upper attaching face of the welt and to cooperate with the wipers to shape the welted margin over the inner form.

66. In a machine for shaping prewelt uppers, an inner form having a downwardly and inwardly beveled margin, a plurality of welt pressers constructed and arranged to engage the outsole attaching surface of the welt of a prewelt upper in the machine, said welt pressers each having a welt engaging surface beveled substantially complementally to the beveled margin of the inner form, and a welt lifter constructed and arranged to engage the upper attaching face of the welt and to cooperate with the welt pressers to shape the welted margin over the inner form.

67. In a machine for shaping prewelt uppers, an inner heel form, a plurality of welt pressers constructed and arranged to engage the outsole attaching surface of the welt of a prewelt upper in the machine and to shape the welted margin against the inner form, and a gage member incorporated in a welt presser and providing means for determining the initial position of the upper heightwise thereof relatively to the inner form.

68. In a machine for shaping shoe uppers, an expander for shaping the toe portion of a supported upper, a member mounting the expander for movement heightwise of the upper with a toeward component, and means for gripping a portion of the upper adjacent to the welt and holding it against displacement during the expanding operation.

69. In a machine for shaping prewelt uppers, a pair of outer forms, upwardly extending lips on the outer forms respectively constructed and arranged to engage a prewelt upper in the welt crease, means against which the outer forms grip a portion of the upper adjacent to the welt to hold it against displacement during an upper shaping operation, an expander, and a member mounting the expander for movement heightwise of the shoe with a toeward component to shape the toe portion of the upper.

70. In a machine for shaping prewelt uppers, a pair of outer forms, upwardly extending lips on the outer forms respectively constructed and arranged to engage a prewelt upper in the welt crease, means against which the outer forms grip the upper to hold it against displacement during an upper shaping operation, an expander movable heightwise of the shoe with toeward component to shape the toe portion of the upper, and resilient means on which the outer forms are supported against downward movements.

71. In a machine for shaping shoe uppers, a pair of outer forms constructed and arranged to engage a portion of an upper in the machine, means against which the outer forms grip said portion of the upper, an expander for shaping the toe portion of the supported upper, means mounting the expander for movement heightwise of the supported upper with a toeward component and a piston for actuating the outer forms and the expander.

72. In a machine for shaping shoe uppers, a pair of outer forms constructed and arranged to engage a portion of an upper in the machine, means against which the outer forms grip said portion of the upper, an expander for shaping the toe portion of the supported upper, an actuator, means whereby the actuator first advances the outer forms into upper gripping positions and then maintains the gripping action of the forms, and means whereby the actuator advances the expander after the forms have been brought into gripping engagement with the upper and while the gripping action of the forms on the upper is maintained by the actuator.

73. In a machine for shaping prewelt uppers, operating instrumentalities, a member constructed and arranged to engage the outsole attaching face of the welt of a prewelt upper in the machine, means for gripping the welted margin against the member, and automatic mechanism for imparting a movement of translation to the gripping means and the member to position the welted margin in predetermined relation to the operating instrumentalities.

74. In a machine for shaping prewelt uppers, operating instrumentalities, a wiper constructed and arranged to engage the outsole attaching face of the welt of a prewelt upper in the machine, a gripper member constructed and arranged to grip the welted margin against the wiper, and automatic mechanism for imparting a movement of translation to the wiper and gripper as a unit thereby to position the welted margin in predetermined relation to the operating instrumentalities.

75. In a machine for shaping prewelt uppers, a wiper constructed and arranged to engage the outsole-attaching face of the welt of a prewelt upper in the machine, a gripper constructed and arranged to engage the inner surface of the upper, and means for actuating the gripper to grip the welted margin against one edge face of the wiper.

76. In a machine for shaping prewelt uppers, a wiper constructed and arranged to engage the outsole-attaching surface of the welt of a prewelt upper in the machine, a gripper constructed and arranged to engage the inner surface of the upper, and means for actuating the gripper to grip the welted margin against the wiper, said wiper being characterized by means for gaging the heightwise position of the upper relatively thereto.

77. In a machine for shaping prewelt uppers, a wiper constructed and arranged to engage the outsole-attaching surface of the welt of a prewelt upper in the machine, a gripper constructed and arranged to engage the inner surface of the upper, means for actuating the gripper to grip the welted margin against the wiper, said wiper being characterized by an extension offset heightwise of the wiper from its wiping surface and arranged to gage the heightwise position of the upper relatively to the wiper.

78. In a machine for shaping prewelt uppers, a wiper constructed and arranged to engage the outsole-attaching surface of the welt, a carrier for the wiper, and a gripper member mounted on the carrier and operable to grip the welted margin against the wiper.

79. In a machine for shaping prewelt uppers, the combination with outer forms constructed and arranged to engage a prewelt upper in the machine, of a wiper constructed and arranged to engage the outsole-attaching surface of the welt, a gripper member operable to grip the welted margin against the wiper, and means for moving the wiper and the gripper member downwardly to bring the welted margin into predetermined heightwise relation to the outer forms.

80. In a machine for shaping prewelt uppers, the combination with an outer form, of a wiper constructed and arranged to engage the outsole-attaching surface of the welt, a wiper carrier, a gripper member mounted in the wiper carrier and constructed and arranged to grip the welted margin against the wiper, and means for imparting downward movement to the carrier to bring the welted margin into predetermined heightwise relation to the outer form.

81. In a machine for shaping prewelt uppers, the combination with an outer form, of a wiper constructed and arranged to engage the outsole-attaching surface of the welt, a wiper carrier, a gripper member mounted in the wiper carrier and constructed and arranged to grip the welted margin against the wiper, means for imparting downward movements to the carrier to bring the welted margin into predetermined heightwise relation to the outer form, means against which the outer form grips the upper after it has been brought into heightwise relation thereto, and means for disengaging the gripper member from the wiper and retracting it into a remote position to permit the wiper to perform an overwiping operation on the welted margin.

82. In a machine for shaping prewelt uppers, a wiper constructed and arranged to engage the outsole-attaching surface of the welt of a prewelt upper in the machine, a wiper carrier mounted for movement heightwise of the upper, a gripper member mounted in the carrier and constructed to grip the welted margin against the wiper, and means for initially positioning the carrier in a location remote from the welted margin heightwise from the upper.

83. In a machine for shaping prewelt uppers, a wiper constructed and arranged to engage the outsole-attaching surface of the welt of a prewelt upper in the machine, a wiper carrier mounted for movement heightwise of the upper, a gripper member mounted in the carrier and constructed to grip the welted margin against the wiper, and springs for initially positioning the carrier in a location remote from the welted margin heightwise of the upper.

84. In a machine for shaping prewelt uppers, the combination with an outer form of a wiper constructed and arranged to engage the outsole-attaching surface of the welt of a prewelt upper in the machine, a parallel motion mechanism for mounting the wiper, an actuator for imparting an overwiping movement to the wiper, and means for operating on one element of the parallel motion mechanism to move the wiper into its overwiping position heightwise of the upper.

85. In a machine for shaping prewelt uppers, the combination with an outer form of a wiper constructed and arranged to engage the outsole-attaching surface of the welt of a prewelt upper in the machine, a gripper for gripping the welted margin against the wiper, means for moving the wiper and the gripper as a unit heightwise of the upper to bring the upper into predetermined relation to the outer form, an actuator for the gripper, breakable connections between the actuator and the gripper, and means for breaking said connections to permit the retraction of the gripper in preparation for overwiping movement of the wiper.

86. In a machine for shaping prewelt uppers, the combination with an outer form, of a wiper constructed and arranged to engage the outsole-attaching surface of the welt of a prewelt upper in the machine, a gripper for gripping the welted margin against the wiper, means normally holding the gripper in an inoperative position remote from the welted margin of the upper, an actuator, means including breakable connections whereby the actuator advances the wiper and the gripper as a unit to bring the welted margin into predetermined relation to the outer form heightwise of the upper, and means for breaking said connections to permit the return of the gripper to its retracted position.

87. In a machine for shaping shoe uppers, an outer form, a wiper, a slide for carrying both the form and the wiper, and an actuator for advancing the form and imparting overwiping movement to the wiper.

88. In a machine for shaping shoe uppers, an outer form, a wiper, a slide for carrying both the form and the wiper, an actuator for advancing the form and imparting overwiping movement to the wiper, and means carried by the slide and operable to move the wiper heightwise of the upper to impart wiping pressure thereto.

89. In a machine for shaping prewelt uppers, an outer form, a wiper constructed and arranged to engage the outsole-attaching face of the welt of a prewelt upper in the machine, a gripper for gripping the welted margin against the wiper, and a carrier for the form, the wiper and the gripper.

90. In a machine for shaping prewelt uppers, an outer form, a slide on which the form is mounted, a wiper constructed and arranged to engage the outsole-attaching surface of the welt of a prewelt upper in the machine, a wiper carrier, means mounting the carrier on the slide, and a gripper for gripping the welted margin against the wiper.

91. In a machine for shaping prewelt uppers, an outer form, a slide on which the form is mounted, a wiper constructed and arranged to engage the outsole-attaching surface of the welt of a prewelt upper in the machine, a wiper carrier, means mounting the carrier on the slide, a gripper for gripping the welted margin against the wiper, an actuator, means whereby the actuator advances the slide, and means whereby the actuator advances the carrier relatively to the slide.

92. In a machine for shaping uppers, an outer form, a first slide on which the outer form is mounted, a wiper for overwiping an upper in the machine, a carrier for the wiper, means mounting the carrier on the first slide for movement relatively thereto, a second slide mounted on the first slide, yielding means whereby the second slide advances the first slide, an actuator, means whereby the actuator advances the second slide, and operating connections between the actuator and the carrier for moving the carrier relatively to the first slide.

93. In a machine for shaping uppers, an outer form, a first slide on which the outer form is mounted, a wiper for overwiping an upper in the machine, a carrier for the wiper, means mounting the carrier on the first slide for movement relatively thereto, a second slide mounted on the first slide, yielding means whereby the second slide advances the first slide, an actuator, means whereby the actuator advances the second slide, operating connections between the actuator and the carrier for moving the carrier relatively to the first slide, a second actuator, and means operated by the second actuator for moving the carrier heightwise of the upper to impart wiping pressure thereto.

94. In a machine for shaping prewelt uppers, an outer form, a slide on which the outer form is mounted, a wiper constructed and arranged to engage the outsole-attaching surface of the welt of a prewelt upper in the machine, a gripper for gripping the welted margin against the wiper, means operable by the advancement of the slide for causing the gripper to grip the welted margin against the wiper, and means rendered operative by advancement of the wiper relatively to the slide for disengaging the gripper from the upper to permit overwiping movement of the wiper.

95. In a machine for shaping prewelt uppers, an outer form, a slide on which the outer form is mounted, a wiper for overwiping the welted margin of the upper, a gripper for gripping the welted margin against the wiper, resilient means normally holding the gripper retracted, means including breakable connections for actuating the gripper, and means operated at the beginning of the advancement of the wiper to break said breakable connections thereby rendering the resilient means operative to retract the gripper.

96. In an upper shaping machine, the combination with means for gripping and holding a shoe upper along a line adjacent to the welt throughout the upper shaping operations, of an expander, and a carrier in which the expander is mounted for movement heightwise of the upper with a toeward component.

97. In an upper shaping machine, the combination with means for gripping and holding a shoe upper along a line adjacent the weft throughout the upper shaping operations, of an expander, and a carrier in which the expander is mounted for rectilinear movement heightwise of the upper with a toeward component.

98. In a machine for shaping shoe uppers, the combination with means for gripping and holding a shoe upper along a line adjacent to the welt throughout the upper shaping operations, of an expander constructed and arranged for movement heightwise of an upper in the machine with a toeward component, a carrier for the expander, yielding means in the carrier for retracting the expander, means including breakable connections for advancing the expander, and means for breaking said breakable connections to permit the yielding means to retract the expander.

99. In a machine for shaping shoe uppers, means for supporting a shoe upper by engagement with its bottom margin, an expander for shaping the toe portion of the upper, a carrier in which the expander is mounted for movement heightwise of the shoe with a toeward component, wipers for overwiping the bottom margin of the upper, means for imparting wiping pressure to the wipers, and a slide mounted on the carrier and constructed and arranged to mount said pressure applying means.

100. In a machine for shaping shoe uppers, an expander for shaping the toe portion of an upper in the machine, wipers for overwiping the bottom margin of the upper, a first slide on which the expander is mounted, a carrier for the first slide, means for applying wiping pressure to the wipers, and a second slide in which the pressure applying means is mounted, said second slide being mounted in the carrier for movement generally heightwise of the upper.

101. In a machine for shaping shoe uppers, an expander for shaping the toe portion of an upper in the machine, wipers for overwiping the bottom margin of the upper, a first slide on which the expander is mounted, a carrier for the first slide, means for applying wiping pressure to the wipers, a second slide in which the pressure applying means is mounted, said second slide being mounted in the carrier for movement heightwise of the upper, and a common actuator for the two slides.

102. In a machine for shaping prewelt uppers, an inner form, an outer form, a wiper constructed and arranged to engage the outsole-attaching surface of the welt of a prewelt upper in the machine, a gripper for gripping the welted margin against the wiper, and an actuator for advancing the inner form into the upper for causing the gripper to grip the welted margin against the wiper and for moving the gripper and the wiper downwardly as a unit to bring the welted margin into predetermined relation to the outer form.

103. In a machine for shaping prewelt uppers, an inner upper-shaping form, an outer form constructed and arranged to cooperate with the inner form in the shaping of the upper, a wiper for wiping the welted margin inwardly over the inner form, a gripper for gripping the welted margin against the wiper, a piston and connections from the piston for advancing the inner form into the upper for actuating the gripper and for moving the wiper heightwise of the supported upper to apply wiping pressure thereto.

104. In a machine for shaping prewelt uppers having a heel station and a toe station, means in the heel station for shaping the heel end portion of a prewelt upper, a power-operated actuator for said upper-shaping means, an inner form in the toe station for shaping the toe portion of a prewelt upper, means for advancing the toe form into a supported upper, a member constructed and arranged to hold the toe form against return movement, means for releasing said member to permit the return of the inner form, and mechanism operated by the advancement of said power-operated actuator in the heel station for operating said releasing means.

105. In a two-station machine for shaping prewelt uppers, an inner form, means for advancing the inner form, a latch member for holding the inner form against return movement, means for releasing the latch member to permit the return of the inner form to its rest position, an actuator and operating connections between the two stations of the machine whereby the actuator operates said releasing means.

106. In a machine for shaping uppers, the combination with means for supporting an inverted prewelt upper by engagement with the upper attaching face of the welt, of an inner form constructed and arranged to engage the inner surface of the upper, a wiper constructed and arranged to wipe the welted margin inwardly over the inner form, and means for moving the wiper heightwise of the upper against the welt thereby to position the upper in predetermined heightwise relation to the supporting means.

107. In a machine for shaping uppers, the combination with means for supporting an inverted prewelt upper by engagement with the upper-attaching face of the welt, of an inner form constructed and arranged to engage the inner surface of the upper, a wiper constructed and arranged to wipe the welted margin inwardly over the inner form, means for moving the wiper heightwise of the upper against the welt thereby to position the welted margin in predetermined heightwise relation to the supporting means, and a stop for limiting such movement of the wiper.

108. In a machine for shaping uppers, the combination with means constructed and arranged to support an inverted prewelt upper by engagement with the upper attaching face of the welt, of a wiper constructed and arranged to engage the sole attaching face of the welt and wipe the welted margin inwardly over an inner form, means for moving the wiper heightwise of the upper against the welt thereby to position the upper in predetermined heightwise relation to the supporting means, and means operating thereafter to effect overwiping movement of the wiper.

109. In a machine for shaping an end portion of a prewelt upper, the combination with a pair of pivotally mounted members constructed and arranged to support an inverted prewelt upper by engagement with the upper attaching face of the welt, of an end wiper constructed and arranged to wipe the welted margin of the supported upper inwardly over an inner form, means for moving the wiper heightwise of the upper thereby to position the supported upper in predetermined heightwise relation to the upper supporting members, a stop for limiting such movment of the wiper, and means operating after the completion of such movement of the wiper to effect overwiping movement thereof.

110. In a machine for shaping prewelt uppers, a pair of pivotally mounted members constructed and arranged to support an inverted prewelt upper by engagement with the upper attaching face of the welt, a slide on which said members are mounted, means on said slide for yieldingly holding said members against movement in one direction, an inner form, a wiper for wiping the welted margin of the supported upper inwardly over the inner form, means for moving the wiper heightwise of the upper to position the upper in predetermined heightwise relation to the supporting members, means operating after the completion of such movement of the wiper to effect overwiping movement thereof, and means for imparting further movement to the wipers heightwise of the upper to press the overwiped margin of the upper against the inner form.

111. In a machine for shaping prewelt uppers, the combination with an inner form constructed and arranged to engage the inner surface of the upper, of a wiper constructed and arranged to engage the sole attaching face of the welt, means for actuating the wiper to wipe the welted margin inwardly over the inner form, a wiper engaging roll, a slide on which said roll is mounted, means for mounting said slide for movement having a component heightwise of the upper, a spring for actuating said slide, and power operated means for energizing said spring.

112. In a machine for shaping prewelt uppers, the combination with an inner form constructed and arranged to engage the inner surface of the upper, of wiping means constructed and arranged to wipe the welted margin of the upper inwardly over the inner form, said wiping means comprising a central wiper having rectilinear movement only and said wipers having both translatory movement and angular movement, and means for gripping the welted margin against the central wiper.

113. In a machine for shaping uppers, means for wiping the bottom margin of an upper over an inner form comprising a pair of side wipers, a carrier on which the wipers are mounted for angular overwiping movement, means mounting the carrier for rectilinear movement, two cam members fixed to the wipers respectively, and two rolls constructed and arranged to operate on the cam members.

114. In a machine for shaping uppers, means for wiping the bottom margin of an upper over an inner form comprising a pair of side wipers, a carrier on which the wipers are mounted for angular overwiping movement, means mounting the carrier for rectilinear movement, two cam members fixed to the wipers respectively, and two rolls constructed and arranged to operate on the cam members during the rectilinear movement of the carrier.

115. In a machine for shaping prewelt uppers, means for wiping the welted margin of a prewelt upper over an inner form comprising a central wiper, a carrier on which the wiper is mounted, means mounting said carrier for rectilinear movement, a pair of side wipers mounted on the carrier for angular overwiping movement, two cam members fixed to the side wipers respectively, and two rolls constructed and arranged to operate on the cam members.

116. In a machine for shaping prewelt uppers, means for wiping the welted margin of a prewelt upper over an inner form, said wiping means comprising a central wiper, a carrier on which the wiper is mounted, a pair of side wipers mounted on the carrier for operative movement toward each other widthwise of the upper, two cam members fixed to the side wipers respectively, two rolls constructed and arranged to engage said cam members during the advancement of the carrier and to cause the side wipers to move toward each other, members for mounting the rolls respectively, and means for adjusting said mounting members toward and from each other.

117. In a machine for shaping prewelt uppers, the combination with an inner form having a flange, of a wiper provided with a work engaging bottom surface and provided with a recess adjacent to said work engaging surface, means for operating said wiper to wipe the welted margin of a supported prewelt upper inwardly over the edge of said flange, and means for applying pressure to the wiper to bend the welted margin about said flange, the recess in the bottom of the wiper providing clearance for the downward movement of the wiper relatively to the flange.

118. In a machine for shaping prewelt uppers, the combination with an inner form and wipers for wiping the welted margin of a supported prewelt upper inwardly over said inner form, of a pair of members constructed and arranged to support an inverted prewelt upper by engagement with the upper attaching face of the welt, a carrier for said upper supporting members, means for yieldingly holding the supporting members against downward movement relatively to the carrier, and a pair of actuators for closing the upper supporting members upon the upper and gripping the upper between the supporting members and the inner form.

119. In a shoe machine, a shoe shaping member, a pressure fluid operated piston for advancing the member, a valve for controlling the operation of the piston, means for retracting the piston when the valve is opened to exhaust, and means for holding the shoe shaping member advanced when the piston is retracted.

120. In a shoe machine, a shoe shaping means, a pressure fluid actuated member for advancing said means, a valve for controlling the operation of said member, a manually operated actuator for operating said valve, means for retracting the member, and means for holding the shoe shaping means advanced when the member is retracted.

121. In a shoe machine, a shoe shaping instrumentality, a pressure fluid actuated member for advancing said instrumentality, a valve for controlling the operation of said member, a manually operated actuator for operating the valve in one direction, a spring for operating the valve in the other direction, means for retracting the member, and means for holding the instrumentality advanced.

122. In a shoe machine, a shoe shaping instrumentality, a pressure fluid actuated piston for advancing the instrumentality into operative position, a valve for controlling the operation of the piston, a spring for retracting the piston when the valve is open to exhaust, and a latch member for holding the instrumentality advanced.

123. In a two station shoe machine, shoe shaping mechanisms in each station each of which comprises a shoe shaping instrumentality, a pressure fluid actuated member for advancing said instrumentality into shoe shaping position, a latch member for holding the instrumentality advanced after the member is retracted, and means in each station for releasing the latch member in the other station.

124. In a shoe machine, a first shoe shaping instrumentality, a pressure fluid actuated piston for advancing said instrumentality into operative position, a valve for controlling the operation of the piston, a second shoe shaping instrumentality, means including a micro-switch for effecting the actuation of said second instrumentality, a manually operated actuator for operating the valve in one direction, a spring for operating the valve in the other direction, and means actuated by said spring for closing the micro-switch.

125. In a shoe machine, a first shoe shaping instrumentality, a first pressure fluid actuated member for advancing said instrumentality, a valve for controlling the operation of the member, a solenoid for operating the valve, a micro-switch for activating the solenoid, a second operating instrumentality, a second pressure fluid actuated member for advancing said second operating instrumentality, a second valve for controlling the operation of said second pressure fluid actuated member, a manually operated actuator for operating the second valve in one direction, a spring for operating the second valve in the other direction, and means actuated by said spring for closing the micro-switch.

126. In a shoe machine, an operating instrumentality, a pressure fluid actuated member for advancing said instrumentality, a spring for retracting said instrumentality, a valve for controlling the operation of said member, a solenoid for operating the valve in one direction, a spring for operating the valve in the other direction, a micro-switch for effecting the activation of the solenoid, a cam for operating the switch, and a manually controlled actuator for operating the cam thereby alternately to open and to close the micro-switch.

127. In a shoe machine, a shoe shaping instrumentality, a pressure fluid actuated member for advancing said instrumentality, a control valve for controlling the operation of said member, a pressure line from the control valve to the member, a shut-off valve in the pressure line, a hand lever, connections from the hand lever for operating the shut-off valve, means for retracting the member when the control valve is opened to exhaust, and means for holding the shoe shaping instrumentality advanced when the member is retracted.

128. In a shoe machine, a shoe shaping instrumentality, a pressure fluid operated piston for advancing the instrumentality, a control valve for controlling the operation of the piston, a pressure line from the control valve to the piston, a shut-off valve in the control line, a hand lever, a slide operated by the hand lever, means whereby the slide operates the shut-off valve, and means for retracting the piston when the valve is opened to exhaust.

129. In a shoe machine, a shoe shaping instrumentality, a pressure fluid operated piston for advancing the instrumentality, a control valve for controlling the operation of the piston, a pressure line from the control valve to the piston, a shut-off valve in the control line, a hand lever, a slide operated by the hand lever, means whereby the slide operates the shut-off valve, means for retracting the piston when the valve is opened to exhaust, and means for holding the instrumentality advanced when the piston is retracted.

References Cited in the file of this patent

UNITED STATES PATENTS

| Number | Name | Date |
|---|---|---|
| 1,376,388 | Brock | Apr. 26, 1921 |
| 1,706,277 | Duplessis | Mar. 19, 1929 |
| 1,853,126 | Holmgren | Apr. 12, 1932 |
| 2,342,154 | MacDonald | Feb. 22, 1944 |
| 2,359,762 | Holmgren | Oct. 10, 1944 |
| 2,379,425 | Duplessis | July 3, 1945 |
| 2,385,336 | Duplessis | Sept. 25, 1945 |
| 2,395,480 | Holmgren | Feb. 26, 1946 |
| 2,480,926 | Holmgren | Sept. 6, 1949 |